United States Patent
Okauchi et al.

[19]

[11] Patent Number: 5,864,360
[45] Date of Patent: Jan. 26, 1999

[54] MULTI-EYE IMAGE PICK-UP APPARATUS WITH IMMEDIATE IMAGE PICK-UP

[75] Inventors: Shigeki Okauchi, Kodaira; Sunao Kurahashi, Kawasaki, both of Japan

[73] Assignee: Canon Kabushiki Kaisha, Tokyo, Japan

[21] Appl. No.: 692,316

[22] Filed: Aug. 5, 1996

Related U.S. Application Data

[63] Continuation of Ser. No. 291,300, Aug. 16, 1994, abandoned.

[30] Foreign Application Priority Data

Aug. 26, 1993 [JP] Japan ................................. 5-211777
Aug. 26, 1993 [JP] Japan ................................. 5-211778

[51] Int. Cl.$^6$ ............................................... H04N 7/18
[52] U.S. Cl. .......................... 348/47; 348/44; 348/43; 348/48; 348/261
[58] Field of Search ........................... 348/47, 48, 262, 348/263, 261, 42, 43, 46

[56] References Cited

U.S. PATENT DOCUMENTS

| | | | |
|---|---|---|---|
| 4,751,570 | 6/1988 | Robinson | 348/47 |
| 4,819,064 | 4/1989 | Diner | 348/47 |
| 4,879,596 | 11/1989 | Miura et al. | 348/47 |
| 4,881,122 | 11/1989 | Murakami | 348/47 |
| 4,999,713 | 3/1991 | Ueno et al. | 358/225 |
| 5,142,357 | 8/1992 | Lipton et al. | 358/88 |
| 5,436,660 | 7/1995 | Sakamoto | 348/207 |
| 5,668,595 | 9/1997 | Katayama et al. | 348/43 |

*Primary Examiner*—Tommy P. Chin
*Assistant Examiner*—Anand S. Rao
*Attorney, Agent, or Firm*—Morgan & Finnegan LLP

[57] ABSTRACT

In a multi-eye image pick-up apparatus, an optical axis angle controller sets the optical axes of first and second video camera portions at predetermined optical axis angles when a power supply voltage for allowing an image pick-up operation is supplied. When the optical axes of the first and second video camera portions do not cross each other at a position in front of the apparatus, in-focus detection is performed using an overlapping region between image pick-up regions of the first and second video camera portions.

4 Claims, 17 Drawing Sheets

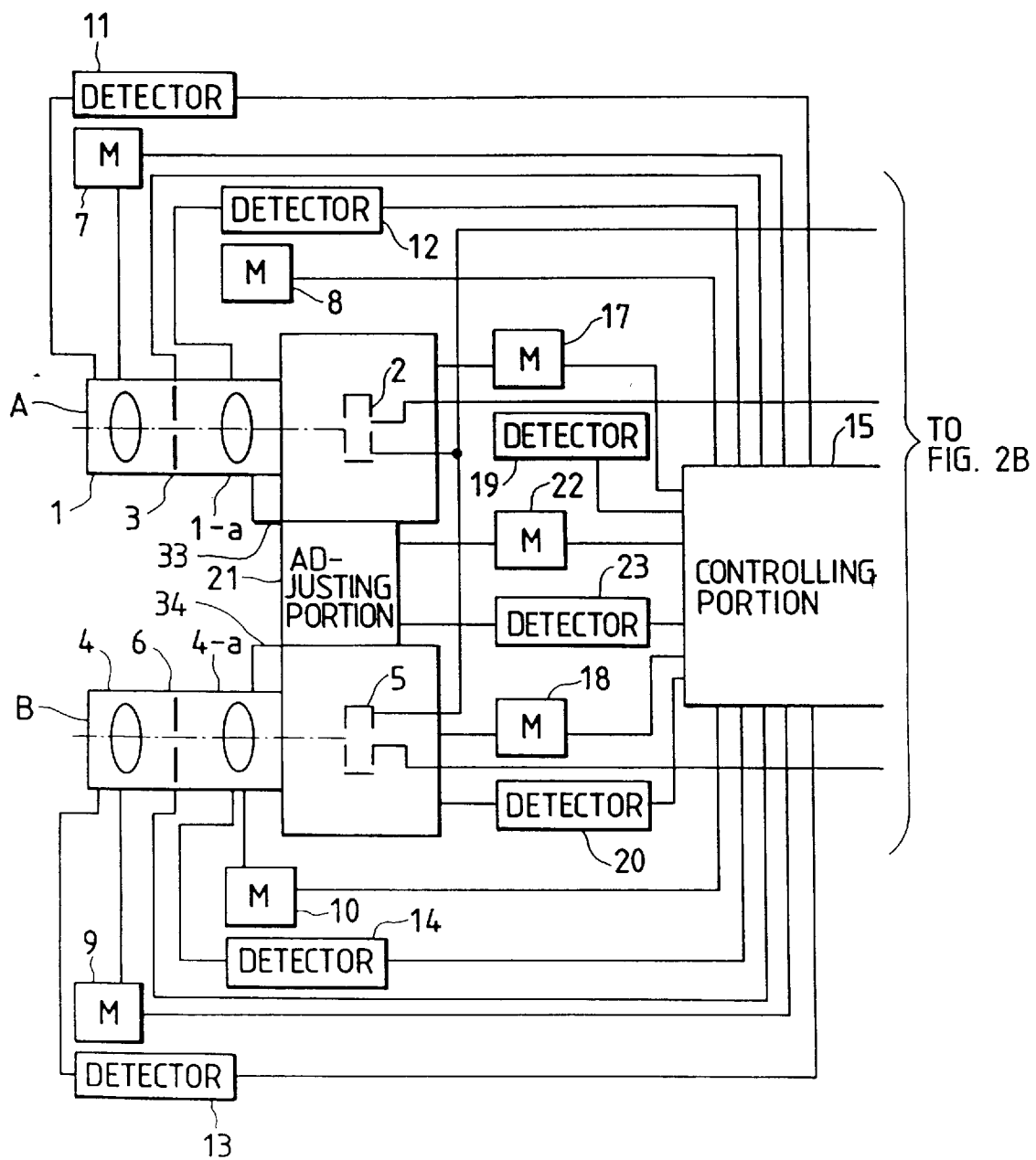

FIG. 7
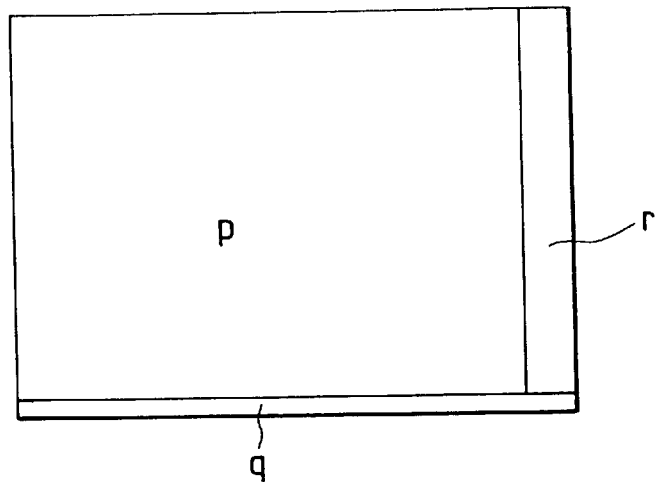
FIG. 8
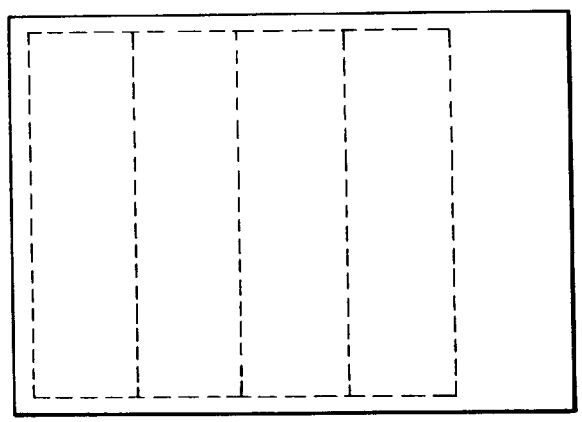
TYPE I 
TYPE II 
TYPE III 
TYPE IV 

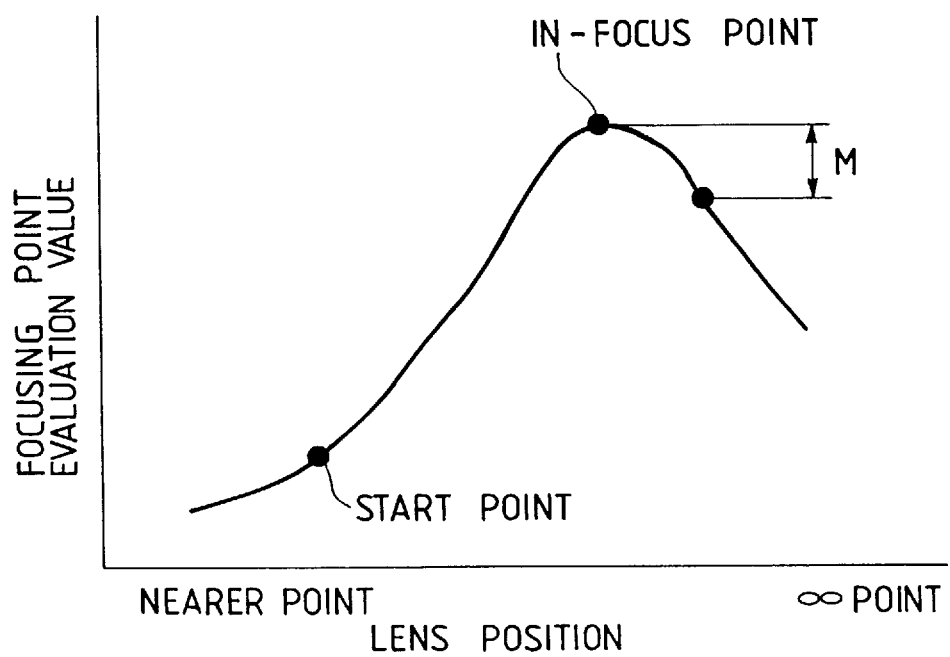

TYPE I
TYPE II
TYPE III
TYPE IV

MULTI-EYE IMAGE PICK-UP APPARATUS WITH IMMEDIATE IMAGE PICK-UP

This is a continuation of application Ser. No. 08/291,300, filed on Aug. 16, 1994, now abandoned.

BACKGROUND OF THE INVENTION

1. Field of the Invention

The present invention relates to a multi-eye image pick-up apparatus using a plurality of video cameras.

2. Related Background Art

Conventionally, as a multi-eye image pick-up apparatus of this type, a stereoscopic image pick-up video camera system disclosed in Japanese Patent Publication No. 5-3199, or the like is known. In this camera system, two video cameras are directed in substantially the same direction to pick up images of an object facing the camera main bodies from different angles, and a stereoscopic image is obtained based on the picked-up images.

However, since the states of the cameras at the time of supply of a power supply voltage are indefinite, a long time is required until an actual image pick-up operation is started.

SUMMARY OF THE INVENTION

The present invention has been made in consideration of the above-mentioned problems, and has as its object to provide a multi-eye image pick-up apparatus which can start an image pick-up operation immediately after a power supply voltage is input.

A multi-eye image pick-up apparatus according to the present invention comprises first and second video camera portions, optical axis direction varying means for varying optical axis directions of the first and second video camera portions in a plane substantially parallel to a plane defined by optical axes of the first and second video camera portions and optical axis angle controlling means for controlling optical axis angles of the first and second video camera portions, and when a power supply voltage for allowing an image pick-up operation is supplied, the optical axis angle controlling means sets the optical axes of the first and second video camera portions at predetermined optical axis angles.

When a power supply voltage for enabling an image pick-up operation is supplied to the multi-eye image pick-up apparatus, the optical axis angle control means sets the first and second video camera portions at a predetermined optical axis angle. For this reason, immediately after the power supply voltage is input, the image pick-up operation can be started.

The optical axis angle to be set will be described in detail below. When the power supply voltage is input, if a stereoscopic image pick-up mode is selected, two cameras are directed toward an object on a perpendicular bisector of a line which connects the pivot centers of the two cameras, and are focused on the object. If a panoramic image pick-up mode is selected, the two cameras are directed at a predetermined angle at which the optical axes of the two cameras do not cross each other and are focused on an object. On the other hand, if a memorizing mode is selected, the two cameras are set at an angle read out from a memorizing portion and are focused on an object.

In the above-mentioned stereoscopic camera, when its in-focus region is directly utilized in a panoramic image pick-up operation, signals in non-overlapping regions of the image pick-up regions of the two cameras are utilized in in-focus detection, and reliable in-focus detection is disturbed.

The present invention has been made in consideration of the above-mentioned problem, and has as its object to provide a multi-eye image pick-up apparatus which can reliably execute in-focus detection even in a panoramic image pick-up mode.

A multi-eye image pick-up apparatus according to the present invention comprises: first and second video camera portions and a focusing arithmetic circuit for detecting focusing states of the first and second video camera portions, and when optical axes of the first and second video camera portions do not cross each other at a position in front of the apparatus, the focusing arithmetic circuit performs in-focus detection using an overlapping region between image pick-up regions of the first and second video camera portions.

When the optical axes of the two video camera portions do not cross each other at a position in front of the apparatus, in-focus detection is performed using an overlapping region of the image pick-up regions of the two cameras, thus achieving reliable in-focus detection.

BRIEF DESCRIPTION OF THE DRAWINGS

FIG. 7 is a view for explaining an extraction position of an image after correlation processing;

FIG. 8 is a view for explaining selection of aspect ratios in a panoramic image pick-up mode;

FIG. 12 is a graph showing a change in lens position in a hill-climbing focusing operation;

DETAILED DESCRIPTION OF THE PREFERRED EMBODIMENTS

Figure 1:
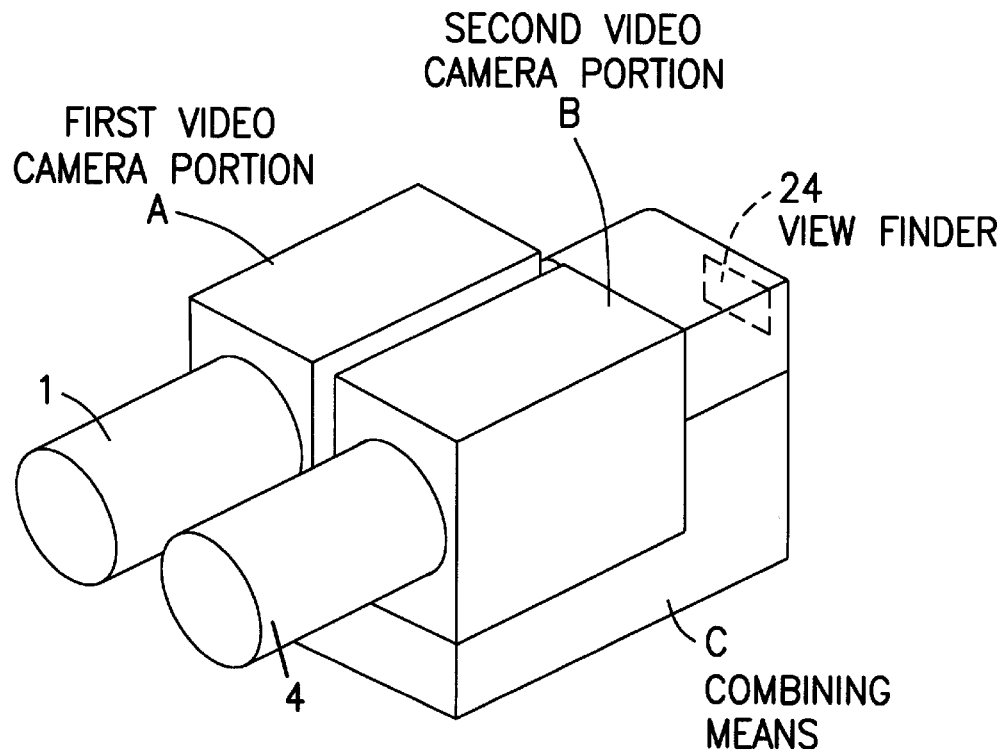
FIG. 1 is a perspective view showing the outer appearance of a multi-eye image pick-up apparatus according to the present invention.
Figure 2B:
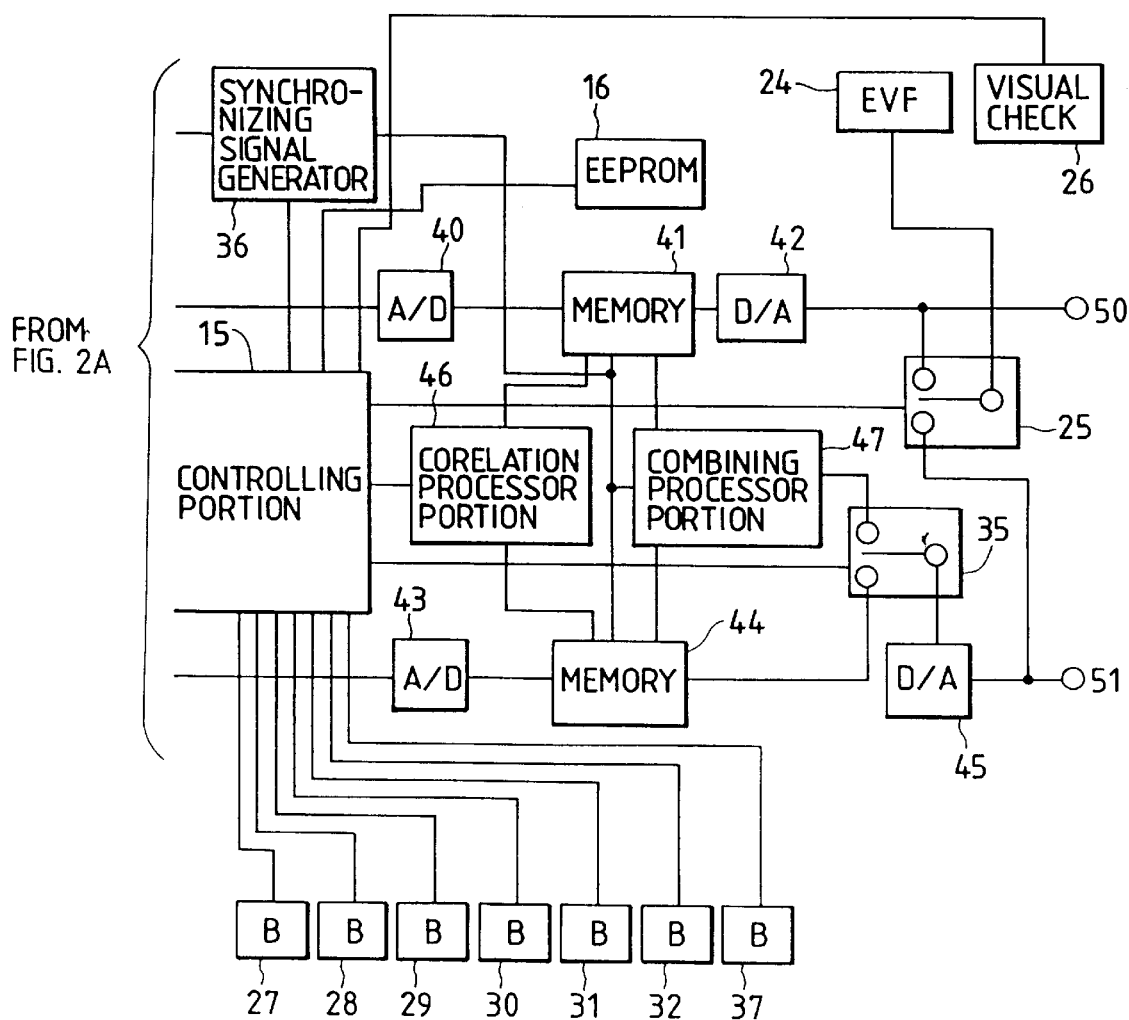
FIG. 2 is comprised of FIG. 2A and FIG. 2B showing block diagrams illustrating an embodiment of the multi-eye image pick-up apparatus according to the present invention.

FIG. 1 is a perspective view showing the outer appearance of an embodiment of a multi-eye image pick-up apparatus according to the present invention, and FIGS. 2A and 2B are block diagrams of the embodiment of the present invention.

First and second video camera portions A and B are arranged substantially parallel to each other in substantially the same direction, and are integrated via a combining means C. Each of the first and second video camera portions A and B is constituted by a main body portion, an optical portion, an electrical circuit portion inside the main body, a semiconductor element using a CCD is used as an image pick-up element. The main bodies have connector portions 50 and 51 for supplying image pick-up outputs corresponding to the video cameras to corresponding memorizing devices such as VTRs, receiving a power supply voltage from an external device, and supplying remote control signals. In this multi-eye image pick-up apparatus, a view finder 24 for displaying an image pick-up output from one video camera is provided to the combining means C.

In order to stereoscopically observe images picked up by the first and second video camera portions A and B, the images from the two video camera portions must be caused to overlap each other on a screen or the screen of a cathode ray tube. In addition, a stereoscopic effect must be obtained when the images overlap each other. For this purpose, an image pick-up operation must be performed by crossing the optical axes of the first and second video camera portions A and B on the object side. Note that the relationship between the crossing position of the optical axes of the two cameras and the position of the object largely influences the stereoscopic effect. For example, when the crossing position coincides with the object position, the display position of a stereoscopic image almost coincides with the screen surface. However, if the crossing position is located in front of the object, the display position of the stereoscopic image is present behind the screen. Conversely, when the crossing position is located behind the object, the display position of the stereoscopic image is present in front of the screen, and corresponds to a position projected from the screen.

In order to properly obtain the stereoscopic effect, the crossing position of the optical axes of the first and second video camera portions A and B must be adjusted in correspondence with the distances between the object and the cameras. The multi-eye image pick-up apparatus of the present invention is achieved in consideration of this respect. In the multi-eye image pick-up apparatus of the present invention, not only a stereoscopic image pick-up operation but also a panoramic image pick-up operation can be realized by switching a switch, as will be described later.

The arrangement of a multi-eye image pick-up camera according to the present invention will be described in detail below with reference to FIGS. 2A and 2B.

Referring to FIGS. 2A and 2B, light for the right eye is picked up by an image pick-up element 2 in the right video camera portion A via a lens group 1, and is output as a right-eye video signal. On the other hand, light for the left eye is picked up by an image pick-up element 5 in the left video camera portion B via a lens group 4, and is output as a left-eye video signal. The right- and left-eye video signals are respectively output to the output terminals 50 and 51 via processing to be described later.

As motors for driving the lens groups 1 and 4, zooming and focusing motors are arranged in the right and left cameras, i.e., a right zooming motor 7, a right focusing motor 8, a left zooming motor 9, and a left focusing motor 10 are arranged. The lens groups 1 and 4 respectively have diaphragms 3 and 6 for adjusting the light-receiving amounts on the corresponding image pick-up elements. Also, position detectors 11, 12, 13 and 14 are arranged to detect the positions of lenses driven by the zooming motors and the focusing motors, and outputs from these detectors are input to a controlling portion 15. The first and second video camera portions A and B respectively comprise distance detectors 33 and 34, each of which is constituted by a light-emitting element and a light-receiving element, measures the distance to an object, and inputs a distance signal to the controlling portion 15. At least one of the distance detectors 33 and 34 is arranged to be rotatable in the horizontal direction, and can measure the distance to an object in a direction designated by a command from the controlling portion 15. An EEPROM 16 memorizes variations in sensitivity of the image pick-up elements, individual differences of the right and left lens groups, and initial values of the angle and interval between the two cameras in the manufacture of the apparatus, as will be described later.

Furthermore, right and left convergence angle motors 17 and 18 for pivoting the corresponding cameras in the horizontal direction to have the light-receiving surfaces of the image pick-up elements 2 and 5 as almost the pivot centers are arranged. The right and left cameras respectively comprise rotational angle detectors 19 and 20, and the outputs from these detectors are input to the controlling portion 15.

More specifically, a convergence angle driving mechanism is realized by meshing worms and wheels, which are operated integrally with the cameras, with driving shafts of stepping motors as the convergence angle driving motors 17 and 18, and converts rotations of the stepping motors into rotations of the cameras. The position detectors 19 and 20 include reference position detectors which are reset by a reference position (initial value) of the camera angle. These reference detectors respectively comprise an up-down counter which is counted up upon counterclockwise rotation of the right video camera portion A, and an up-down counter which is counted up upon clockwise rotation of the left video camera portion B.

The right video camera portion A comprises an adjusting portion 21 for adjusting the interval between the right and left cameras, an adjusting motor 22 for driving the adjusting portion 21, and an interval detector 23 for detecting the interval between the right and left cameras. The output from the detector 23 is input to the controlling portion 15.

The image pick-up elements 2 and 5 are synchronously driven by a synchronizing signal generator 36, and analog video signals output from the two elements are respectively input to A/D converters 40 and 43 for converting the input signals into digital video signals via amplifiers (not shown). The digital video signals output from the A/D converters 40 and 43 are respectively memorized in image memories 41 and 44 whose read/write accesses are controlled by the synchronizing signal generator 36, and an image correlation processor portion 46 performs an image correlation calculation on the basis of the digital video signals memorized in the image memories 41 and 44. The calculation result of the image correlation processor portion 46 is input to the controlling portion 15, and is used for changing read addresses from the memories or the time base. An image combining processor portion 47 combines images based on the calculation result obtained by the image correlation processor portion 46 in a panoramic image pick-up mode. D/A converters 42 and 45 respectively convert digital signals output from the image memories 41 and 44 or the image combining processor portion 47 into analog video signals. As a signal to be output to the D/A converter 45, one of signals output from the image memory 44 and the image combining processor portion 47 is selected by a stereoscopic-panoramic selection SW 35.

The view finder 24 can display analog video signals obtained via the D/A converters 42 and 45. The view finder 24 is pivotally attached to the combining means C. Since the view finder 24 is pivoted through 180° to move the eyepiece portion of the view finder 24 to the opposite side of the camera main body, the view finder 24 can be observed not only by the right eye but also by the left eye. When the view finder 24 is pivoted through 180°, it is vertically inverted. However, the view finder can be rotated by a mechanism (not shown), and no problem is posed.

Furthermore, in a stereoscopic image pick-up mode, a signal to be output to the view finder 24 can be selected from one of the signals from the right and left video camera portions A and B using a main camera selection SW 25. More specifically, when a photographer looks into the view finder 24 with his or her right eye, the right camera can be selected as the main camera; otherwise, the left can be selected as the main camera. In a panoramic image pick-up mode, in this embodiment, since the main camera is switched to the left camera, a panoramic image combined based on signals picked up by the right and left cameras can be observed via the view finder 24. The view finder 24 comprises a visual axis detector 26, and can detect a visual axis position.

The camera main body comprises, as operation buttons or SWs, a camera standby button 27, a zooming operation button 28, an object selection button 29, an object tracking button 30, a status memorizing button 31, the stereoscopic-panoramic selection SW 35, and an initial state selection SW 32. The initial state selection SW 32 sets a camera state in a camera standby mode as an initial state, or memorizes a camera state upon depression of the status memorizing button 31, and automatically restores the memorized state in the standby mode.

A zoom focusing system in this embodiment will be described below.

This embodiment adopts a rear focusing type lens system, and a focusing lens 1-a has both a function of a correction lens for correcting movement of a focal plane upon a change in focal length, and a function of a focusing lens. More specifically, in a lens system of this type, since the correction lens also serves as a focusing lens, the moving locus of the correction lens varies depending on the object distance during zooming. Thus, a plurality of focusing lens moving loci are memorized in the controlling portion 15, and a locus is selected in corresponding with the object distance, thereby moving the focusing lens 1-a.

Since a difference in field angle, a shift in optical axis upon zooming, and a shift in focusing timing caused by, e.g., variations of the right and left lens groups may bring about shortcomings of the multi-eye image pick-up system, correspondence data of right and left zoom lens positions for setting the same field angles, and correspondence data of distances to an object and right and left focusing lens positions at that time are written in the EEPROM 16 in the manufacture of the apparatus.

A visual axis detection system of this embodiment will be described below.

In this embodiment, the view finder 24 comprises the visual axis detector. As a method of detecting a visual axis, for example, in Japanese Laid-Open Patent Application No. 61-172552, a collimated light beam from a light source is projected onto a front eye portion of the eyeball of an observer, and the visual axis is obtained by utilizing a cornea reflection image based on light reflected by the cornea and the imaging position of the pupil.

Figure 3A:
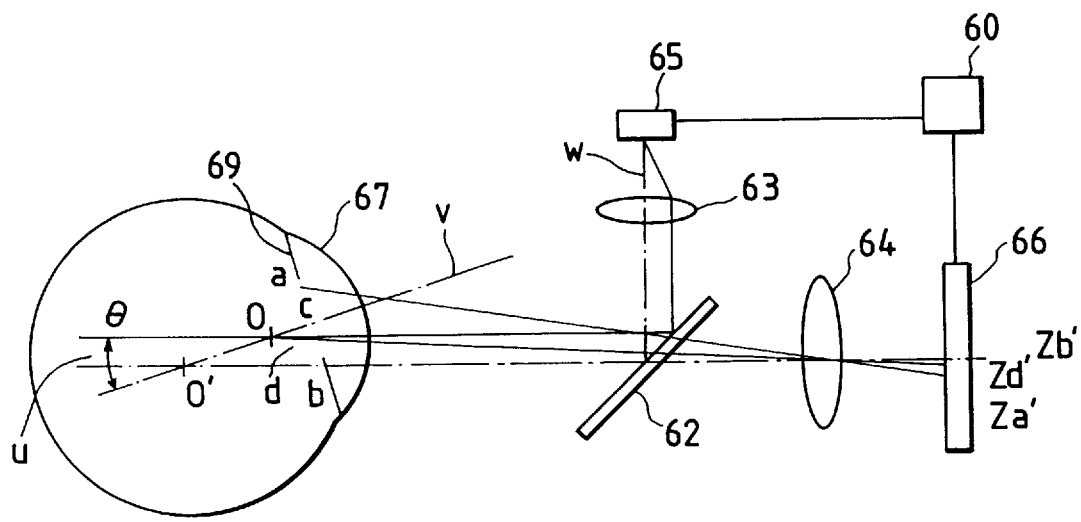
FIGS. 3A and 3B are views for explaining the principle of visual axis detection.
Figure 3B:
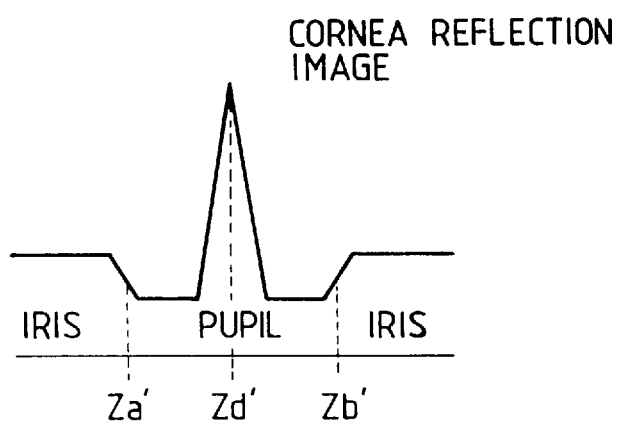

FIGS. 3A and 3B are views for explaining the principle of visual axis detection. FIG. 3A is a schematic view of a visual axis detection optical system, and FIG. 3B is an output intensity chart of a photoelectric element array 66.

Referring to FIG. 3A, a light source 65 such as a light-emitting diode for emitting infrared light which cannot be sensed by an observer is arranged on the focal plane of a projection lens 63. Infrared light emitted from the light source 65 is converted into collimated light by the projection lens 63, and the collimated light is reflected by a half mirror 62 to illuminate a cornea 67 of the eyeball. A cornea reflection image (virtual image) d formed by some light components of the infrared light reflected by the surface of the cornea 67 is transmitted through the half mirror 62, and is focused by a light-receiving lens 64 to be projected at a position Zd' on the photoelectric element array 66. Light beams from edge portions a and b of an iris 69 form images of edge portions a' and b' at positions Za' and Zb' on the photoelectric element array 66. When a rotational angle θ of an optical axis v of the eyeball with respect to the optical axis (u) of the light-receiving lens 64 is small, if the Z-coordinates of the edge portions a and b of the iris 69 are respectively represented by Za and Zb, a coordinate Zc of a central position c of the pupil is given by:

$$Zc \cong (Za+Zb)/2$$

Since the Z-coordinate of the cornea reflection image d coincides with that of a center O of curvature of the cornea 67, if the Z-coordinate of the generation position d of the cornea reflection image is represented by Zd and the distance between the center O of curvature of the cornea 67 and the center c of the pupil is represented by Oc, the rotational angle θ of the optical axis v of the eyeball satisfies a relation:

$$Oc \times \text{SIN } \theta \cong Zc-Zd \quad (1)$$

For this reason, when an arithmetic processor device 60 detects the positions of feature points (the cornea reflection image d and the edge portions a and b of the iris) projected onto the photoelectric element array 66, as shown in FIG. 3B, the rotational angle θ of the optical axis v of the eyeball can be calculated. At this time, relation (1) is rewritten as:

$$\gamma \times Oc \times \text{SIN } \theta \cong (Za'+Zb')/2-Zd' \quad (2)$$

where γ is the magnification determined by the position of the eyeball with respect to the light-receiving lens 64.

Furthermore, when the rotational angle θ of the eyeball optical axis of the observer is calculated, the visual axis of the observer can be obtained by correcting the optical axis of the eyeball and the visual axis.

FIGS. 3A and 3B exemplify a case wherein the eyeball of the observer is rotated in the Z-X plane (e.g., the horizontal plane). However, the same detection method can be applied even when the eyeball of the observer is rotated in the X-Y plane (e.g., the vertical plane).

The operation of the multi-eye image pick-up apparatus according to this embodiment will be described below.

Figure 4:
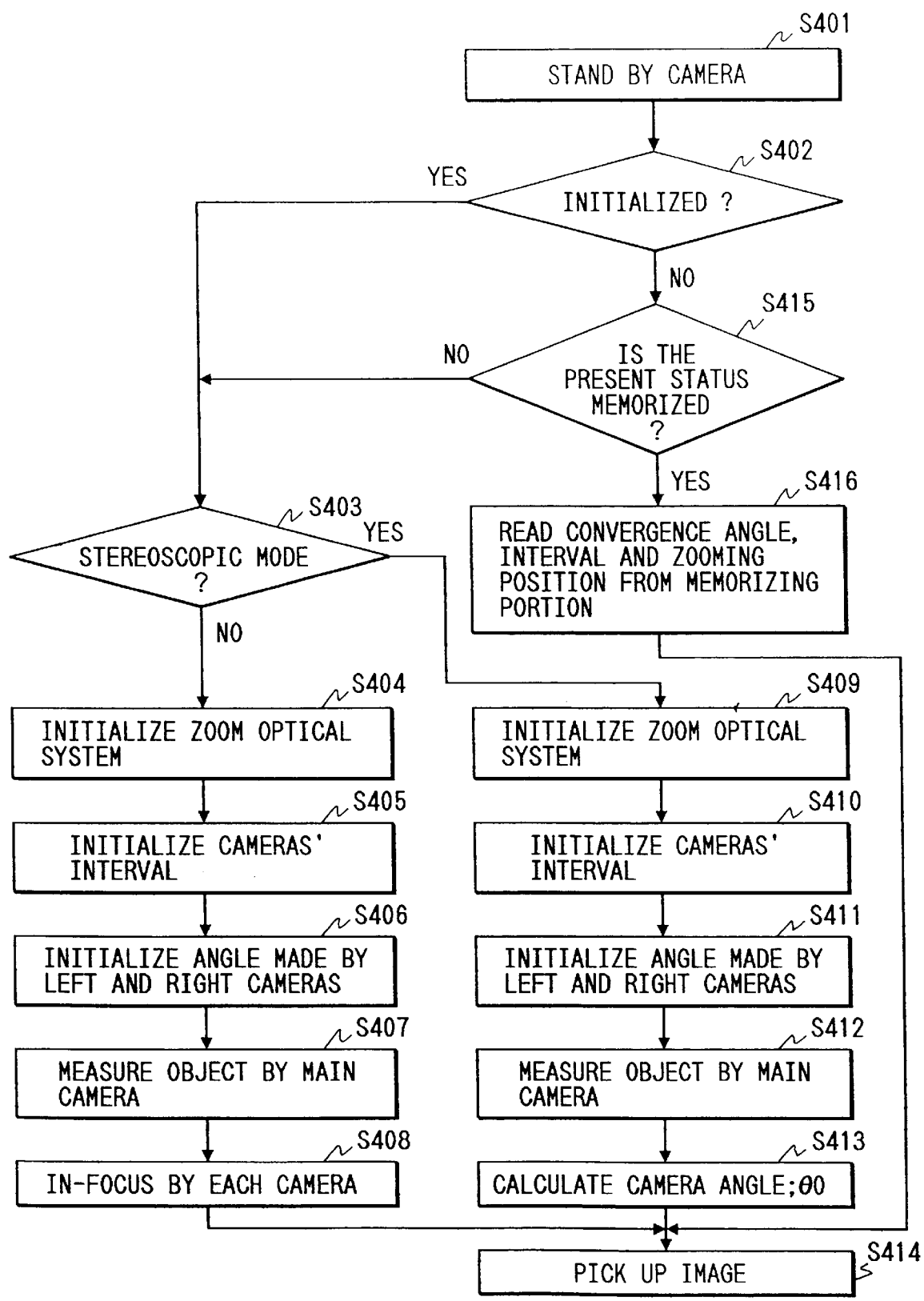
FIG. 4 is a flow chart showing initialization processing of the apparatus when the apparatus of the embodiment shown in FIGS. 2A and 2B receives a power supply voltage.

FIG. 4 is a flow chart showing the controlling operation by the controlling portion 15 of this embodiment. An initializing operation of the apparatus of this embodiment will be described below with reference to FIG. 4.

When the camera receives a power supply voltage and is set in a standby state (step S401), the controlling portion 15 detects the states of the initial state selection SW 32 and the stereoscopic-panoramic selection SW 35 to check if the operation mode of the apparatus is an initializing mode or a memorizing mode (step S402). If the initializing mode is selected, the controlling portion 15 checks if the stereoscopic image pick-up mode or the panoramic image pick-up mode is selected (step S403).

If the initializing mode and the stereoscopic image pick-up mode are selected, the controlling portion 15 sets initial values in the zoom optical systems of the two cameras (step S409), and then initializes the cameras' interval by driving the adjusting motor 22, so that the interval between the two cameras is adjusted to a predetermined initial value (step S410). Furthermore, the controlling portion 15 initializes an angle made by or optical axis angle of the right and left cameras by driving the two cameras, so that the two cameras extend perpendicular to a line connecting their centers of rotation and parallel to each other (step S411). These initializing operations are performed based on angle offset values which are measured from reference values of the angle detectors 19 and 20 in the manufacture of the apparatus so as to attain the above-mentioned state, and are written in the EEPROM 16.

Then, using the camera selected by the main camera selection SW 25, e.g., the distance detector 33 of the right first video camera portion A, the distance to an object in front of the right video camera portion A and a camera angle θ0 are measured (steps S412 and S413), and thereafter, an object image is picked up (step S414).

Figure 5:
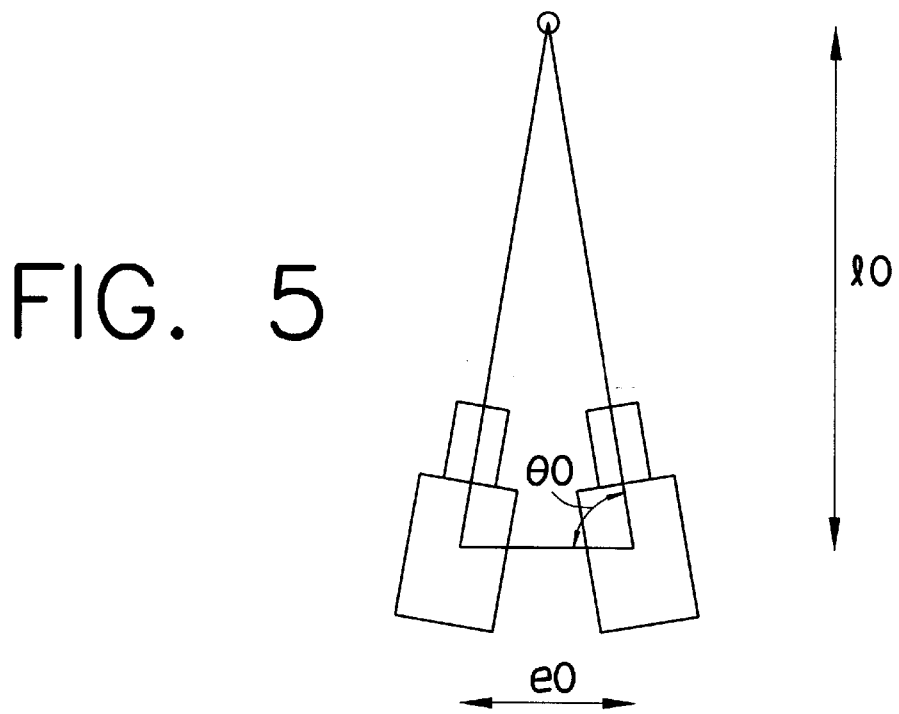
FIG. 5 is a view for explaining an operation for setting an initial camera angle in a stereoscopic image pick-up mode.

As shown in FIG. 5, if the measurement result is represented by l0 and the cameras' interval is represented by e0, the camera angle θ0 is given by:

$$\theta 0 = ATAN(2 \times l0/e0)$$

(ATAN represents an inverse function of TAN; the same applies to the following description)

The controlling portion 15 directs the two cameras toward an object, and executes a focusing operation. More specifically, the cameras are automatically directed toward an object located on the perpendicular bisector of a line connecting the pivot centers of the two cameras, and are driven to achieve an in-focus state.

In this embodiment, a cameras' interval of at most about 10 cm is assumed. For this reason, no problem is posed even when an object facing the right video camera portion A is used as one on the perpendicular bisector. If a larger-scale system is assumed, even when the two cameras are separated by an interval as large as several tens of centimeters or several meters, the distance to an object can be measured under substantially the same condition as described above by arranging another distance sensor on the perpendicular bisector or by setting a detection mode for receiving the output from the light-emitting element of the right video camera portion A by the light-receiving element of the left video camera portion B. Furthermore, given accuracy can be assured by symmetrically arranging the distance detectors of the two cameras about the perpendicular bisector.

A case will be described below wherein the initializing mode and the panoramic image pick-up mode are selected.

The controlling portion 15 drives the two cameras, so that the two cameras extend perpendicular to a line connecting their centers of rotation and parallel to each other, in the same manner as in the case wherein the initializing mode and the stereoscopic image pick-up mode are selected (steps S404 to S406). Then, the distance to a portion where the field angles of the two cameras overlap each other (in this case as well, an object facing the right camera may be used) is measured (step S407), and the two cameras are driven to achieve an in-focus state on the basis of the measured value (step S408). Thereafter, an object image is picked up (step S414).

When the memorizing mode is selected, it is checked if the status at the time of depression of the status memorizing button 31 is memorized in the EEPROM 16 (step S415). The state of the stereoscopic-panoramic selection SW, the angle made by the right and left cameras, the cameras' interval, and the zoom positions at the time of depression of the status memorizing button 31 are fetched, and the controlling portion 15 restores the memorized state based on the fetched values (step S416). Thereafter, an object image is picked up (step S414).

If it is confirmed in step S415 that no status is memorized in the EEPROM 16, the flow advances to step S403 to automatically set the initializing mode.

The image pick-up operation of this embodiment will be explained below.

In this embodiment, the stereoscopic image pick-up mode has the following two visual axis detection modes by utilizing the above-mentioned visual axis detection function, that is, an object selection mode and an object tracking mode.

The object selection mode will be described below with reference to FIGS. 6A to 6D. In the following description, the right video camera portion A is selected as the main camera.

Figure 6A:
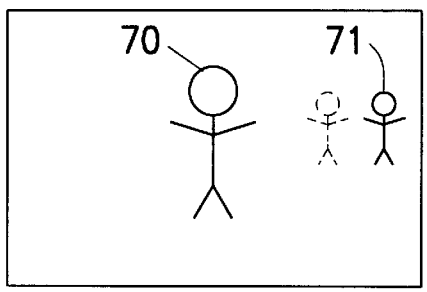
FIGS. 6A, 6B, 6C and 6D are views for explaining two image pick-up modes which can be realized when visual axis detection is adopted in the embodiment shown in FIGS. 2A and 2B.
Figure 6B:
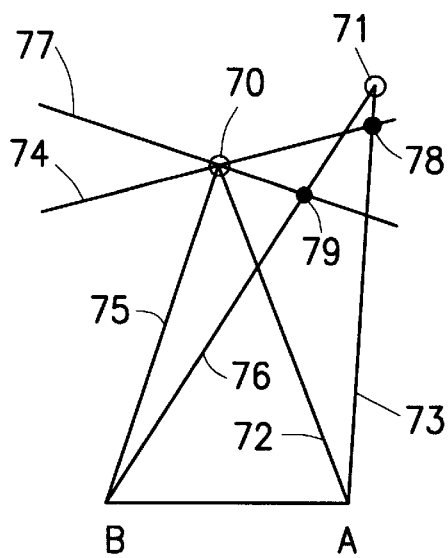

FIG. 6A shows images which are being picked up and displayed in the view finder 24. FIG. 6B illustrates the relationship among the right and left video camera portions A and B and objects. Assume that lines respectively connecting objects 70 and 71 with the right video camera portion A are represented by 72 and 73, and a line passing the object 70 and perpendicular to the line 72 is represented by 74. Also, assume that lines respectively connecting the objects 70 and 71 with the left video camera portion B are represented by 75 and 76, and a line passing the object 70 and perpendicular to the line 75 is represented by 77.

The object 70 is located at the position where the optical axes of the right and left cameras cross each other. However, since the object 71 is offset from this position, the object 71 is viewed by the right video camera portion A as if it were located at an intersection 78 between the lines 73 and 74 on the screen. On the other hand, the object 71 is viewed by the left video camera portion B as if it were located at an intersection 79 between the lines 76 and 77 on the screen. More specifically, when images picked up by the two cameras are caused to overlap each other, an image of the object 71 is doubled, as indicated by a broken line in FIG. 6A.

A stereoscopic image obtained at that time is observed as if the object 70 were present on the screen, and the object 71 were present on the deep side of the screen. Thus, when the object selection button 29 is depressed while an observer gazes the object 71, the angle of the left video camera portion B is automatically changed, so that images of the object 71 picked up by the right and left cameras overlap each other. Therefore, when images picked up by the right and left cameras at that time are caused to overlap each other, an image of the object 70 is doubled in turn.

This operation will be described below with reference to FIG. 6C. The same reference numerals in FIG. 6C denote the same portions as in FIG. 6B, and a detailed description thereof will be omitted.

If a line connecting the centers of rotation of the right and left video camera portions A and B is represented by 80, the distance between the centers is represented by e1, the distance between the right or left video camera portion A or B and the object 70 (assumed to be located on the perpendicular bisector of the line 80) is represented by l1, the distance between the right video camera portion A and the object 71 is represented by l2, the distance between the left video camera portion B and the object 71 is represented by l3, the angle formed by the line 80 and the line 72 or 75 is represented by θ1, the angle formed by the lines 73 and 72 is represented by θ2, the angle formed by the lines 76 and 80 is represented by θ3, a line passing the object 71 and parallel to the line 74 is represented by 81, and a line passing the object 71 and parallel to the line 77 is represented by 82, a distance l4, in the horizontal direction, of the object 71 from a screen center 83 on the screen upon observation via the video camera portion A is given by the following equation (since the object 70 is located at the center of the screen):

$$l4 = l2 \times \text{SIN } \theta2$$

On the other hand, a distance l5, in the horizontal direction, of the object 71 from a screen center 84 on the screen upon observation via the video camera portion B is given by:

$$l5 = l3 \times \text{SIN}(\theta1 - \theta3)$$

Thus, in order to cause the image of the object 71 picked up by the left video camera portion B to overlap that picked up by the right video camera A, the screen of the left video camera portion B can be shifted to the left. In this case, a shift amount l6 is given by:

$$l6 = l4 - l5$$

Figure 6D:
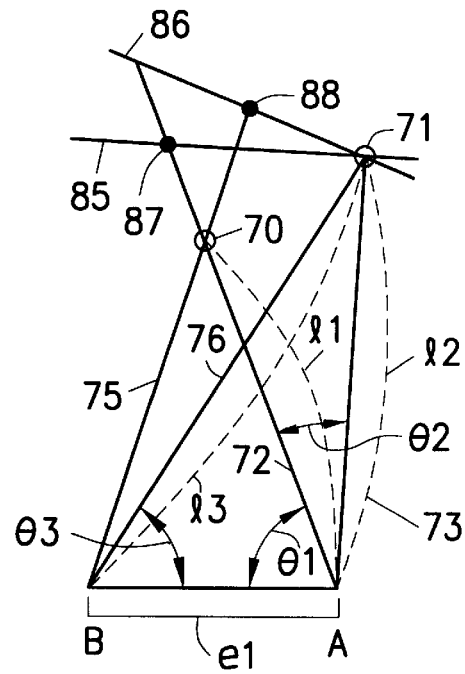
Figure 6C:
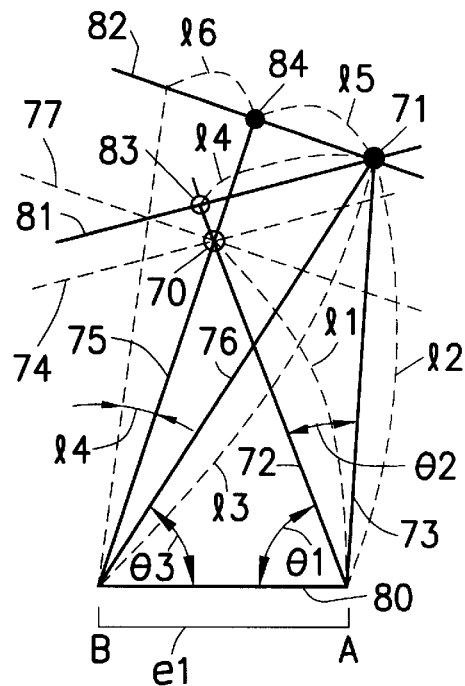

In order to realize this control in practice, the left video camera portion B can be rotated counterclockwise by θ4 in FIG. 6C. The rotational angle θ4 is given by:

$$\theta4 = \text{ATAN}(l6/(l3 \times \text{SIN}(\theta1 - \theta3)))$$

When the left video camera portion B is rotated by this angle by the left convergence angle motor 18, a state gazing the object 71 is attained.

Note that the distance e1 is data obtained from the interval detector of the adjusting portion 21, the distance l1 is obtained from the distance detector 33 or 34, and the angle θ1 is obtained from the angle detector 19 or 20. The angle θ2 is obtained from the visual axis detector 26, the distance l2 can be obtained by executing distance measurement after the distance detector is rotated by θ2, and the angle θ3 is calculated from l2, θ1, θ2, and e1 using the following equation:

$$\theta3 = \text{ATAN}(l2 \times \text{SIN}(\theta1 + \theta2)/(e1 + l2 \times \text{COS}(\theta1 + \theta2))) \quad (3)$$

Since the distance l3 is calculated from θ1, θ2, and θ3 using the following equation, the above-mentioned mode can be easily realized:

$$l3 = l2 \times \text{SIN}(\theta1 + \theta2)/\text{SIN } \theta3 \quad (4)$$

The actual operation in this mode will be explained below. When an observer gazes an object selected via the view finder and depresses the object selection button, the distance detector 33 of the right video camera portion A is rotated by θ2 obtained from the visual axis detector 26 and measures the distance l2 between the right video camera portion A and the object 71. Thereafter, θ3, l3, and θ4 are calculated from data obtained from the respective detectors, i.e., e1, l1, l2, θ1, and θ2, and focusing data corresponding to l2 and l3 are read out from the EEPROM 16 to attain an in-focus state of both the right and left cameras. Thereafter, the left video camera portion B is rotated based on the obtained θ4.

However, it is impossible to mechanically eliminate a vertical offset between right and left images under all image pick-up conditions. For this reason, a stereoscopic image picked up by the above-mentioned operation includes a vertical offset component. The vertical offset component becomes one of factors disturbing a stereoscopic view. Thus, signals picked up by the two cameras are temporarily memorized in the image memories 41 and 44, and a correlation between two images is calculated by the image correlation processor portion 46. The correlation calculation can be performed for only a region corresponding to the detected visual axis of, e.g., 3×10 regions obtained by dividing the screen.

Various correlation calculation methods are available, and a matching method is adopted in this embodiment. Of signals picked up by the right and left cameras, image signals in the same region are binarized, a binary image, which is obtained from the signal picked up by the right video camera portion A selected as the main camera, is moved in the horizontal and vertical directions by a predetermined amount s (e.g., for one pixel), and a difference δ from the other binary image is then calculated. This calculation is performed while sequentially shifting images to calculate shift amounts X and Y, which can minimize the difference δ. Then, the vertical offset is eliminated using the value Y.

When two images are offset by X and Y, as described above, a common portion between the two images is narrower than a picked-up region. More specifically, as shown in FIG. 7, an effective region p as an image corresponds to a portion excluding a portion r which is to be deleted so as not to change the field angle from that of a non-common portion q. In order to widen this effective region p to the entire picked-up region, a cycle for reading out data in the memories by the synchronizing signal generator 36 is prolonged in the horizontal direction, and data are read out from the memory in the vertical direction by interpolating data. Thus, the vertical offset between the right and left images of the selected object can be eliminated, and an observer can observe the selected object as if the stereoscopic image of the selected object moves from the deep side of the screen to the position on the screen.

In this embodiment, the calculation is performed while shifting an image by one pixel at a time. For example, the calculation may be performed while shifting an image in units of five pixels, and an interpolation may be performed near a position where the minimum value of the difference δ is obtained, so as to obtain X and Y. Thus, the calculation time can be shortened.

The object tracking mode will be described below with reference to FIG. 6D. The same reference numerals in FIG. 6D denote the same portions as in FIG. 6B, and a detailed description thereof will be omitted.

Assume that a line, which passes the object 71 and extends perpendicular to the line 73 connecting the right video camera portion A and the object 71, is represented by 85, a line which passes the object 71 and extends perpendicular to the line 76 connecting the left video camera portion B and the object 71, is represented by 86, an intersection between the line 85 and the line 72 connecting the right video camera portion A and the object 70 is represented by 87, and an intersection between the line 86 and the line 75 connecting the left video camera portion B and the object 70 is represented by 88.

When an observer depresses the object tracking button 30 while gazing the object 71 from the state shown in FIG. 6B, the distance detector 33 is rotated clockwise by the angle θ2 obtained by the visual axis detector 26, and obtains the distance l2 to the object 71. Then, the angle θ3 at which the optical axes of the left video camera portion B and the right video camera portion A cross at the position of the object 71 is calculated from equation (3), and the positions of the focusing lenses corresponding to l3 and l2 obtained from equation (4) are read out from the EEPROM 16 to attain focusing of the two cameras on the object 71. Thereafter, the right and left video camera portions A and B are rotated clockwise based on the angles θ2 and θ3. Then, the object 71 automatically moves to the center of the screen. At this time, an image is output after the above-mentioned processing for eliminating the vertical offset.

In this embodiment, the distance measuring system using the light-emitting element and the light-receiving element has been exemplified as the distance measuring means of each camera. In this system, since the sensor must be rotated upon selection of an object, a rotation mechanism therefor is rather complicated. As other systems of the distance measuring means, a phase difference type and a TV signal detection type are available. In the phase difference type, the focusing operation of an object is performed based on an offset amount between a plurality of object images which are formed via different optical paths, and no mechanism for rotating the sensor is required. However, in order to detect the visual axis more finely, the number of detection units increases accordingly. In the TV signal detection type, the visual axis is detected, a specific high-frequency component (e.g., 1 MHz) of a video signal in a region corresponding to the visual axis is extracted using a band-pass filter, and the position of the focusing lens is adjusted to maximize the amplitude of the high-frequency component, thereby adjusting the focusing point position. In this type, a signal processing circuit for the detection system must be added, and the time until detection of an in-focus state is longer than those of the above-mentioned two methods.

The above-mentioned three methods have both merits and demerits, and may be arbitrarily adopted.

The panoramic image pick-up mode will be described below.

In the panoramic image pick-up mode, the two cameras are set to be pivoted with respect to the perpendicular bisector of the line connecting the centers of rotation of the two cameras, and one of a plurality of aspect ratios can be selected by a aspect ratio changing button 37. The overlapping degree of images picked up by the two cameras is determined by the selected aspect ratio.

FIG. 8 shows the overlapping region in the right video camera portion A, and in this embodiment, the overlapping region can be changed by four steps. When the distance to an object is sufficiently larger than the cameras' interval, a ratio κ of the field angle of the overlapping region to the field angle of each of the two cameras is given by:

$$\kappa=1/(1+\text{TAN }\alpha\times\text{TAN}(\alpha+\beta))/(2\times((1/(1+\text{TAN }\alpha\times\text{TAN}(\alpha-\beta))-(\text{COS }\alpha)^2)) \quad (5)$$

where α is the camera angle from the initial state of the panoramic image pick-up mode of the camera, and β is an angle half the horizontal field angle determined by the zoom magnification. As can be understood from the above equation, the ratio κ is determined by the zoom magnification and the camera angle independently of the object distance. Conversely, when the ratio κ is selected and the zoom magnification at that time is known, the camera angle can be calculated from equation (5). For example, when type II in FIG. 8 is selected, the camera angle corresponding to the selected overlapping region is calculated, and the two cameras are pivoted to perform a focusing operation on the overlapping region. Picked-up digital video signals are respectively memorized in the image memories 41 and 44, and the image correlation processor portion 46 performs the image correlation calculation on the basis of the digital video signals memorized in the image memories 41 and 44. In this case, the position of a region serving as the overlapping region in the panoramic image pick-up mode with respect to the screen is measured by the matching method as in the stereoscopic image pick-up mode, and the two images are memorized in the image combining processor portion 47 to overlap each other at the measured position.

Image information memorized in the image combining processor portion 47 has an amount larger than normal information for one screen, and the data amount in the memory is larger than normal data in the horizontal direction. In order to display such information on a normal monitor, the read cycle of the synchronizing signal generator 36 is shortened. In order to set the same magnification in the horizontal and vertical directions, data can be read out by trimming the upper and lower portions of the screen in the vertical direction, and compressing or thinning out the data.

The output from the image combining processor portion 47 is switched by the stereoscopic-panoramic selection SW 35, and is output to the output terminal 51 via the D/A converter 45. Since the output from the D/A converter 45 is an analog video signal, it can be observed by the view finder 24. For this reason, the aspect ratio can be changed while observing an image via the view finder 24. When the aspect ratio changing button is depressed at that time, an image stored in the image combining processor portion 47 is output until the camera angle is set and the focusing operation is finished. For this reason, a noisy image during the camera operation is not output.

In this embodiment, the angle detector for detecting a convergence angle is constituted by the reference position detector and the up-down counter. However, the angle detector is not limited to this. For example, when an absolute type encoder is attached to a wheel arranged integrally with the camera, angle information is not lost even after the power supply is turned off. For this reason, the reference position detector can be omitted. With this arrangement, since the reference position need not be searched in the standby mode, the standby time can be shortened. In addition, regarding the motor, since a DC motor can be used in place of the stepping motor, the above-mentioned arrangement is suited for cost reduction.

In this embodiment, in the stereoscopic image pick-up mode, the two cameras are directed toward an object on the perpendicular bisector of the line connecting the pivot centers of the two cameras, but the present invention is not limited to this. For example, when the standby button is depressed, and the cameras become parallel to the perpendicular bisector, the distance measuring means may perform a distance measuring operation while being pivoted so as to search an object closest to the cameras, and the cameras may be directed toward the closest object.

In this embodiment, in the initializing operation in the panoramic image pick-up mode, the right and left cameras are set to be parallel to each other. However, one of the aspect ratios selected in FIG. 8, e.g., type I may be automatically set.

In this embodiment, the optical axes can be directed toward an object by pivoting the cameras. However, the optical axes may be directed toward an object using optical elements, e.g., variable apical angle prisms (to be referred to as VAPs hereinafter) without arranging a mechanism for pivoting the cameras.

The VAP is constituted by sealing, e.g., silicone-based oil between two glass plates coupled via a bellows, and the apical angle of the prism can be varied by changing the relative angle between the two glass plates. By changing the angles of the glass plates, the refraction angle of a light beam passing through the VAP can be controlled.

In this proposal, the optical axes of the two cameras need only be pivoted in the horizontal plane. For this reason, the following arrangement may be adopted. That is, one of the two glass plates is fixed in position, and the other glass plate is pivotally supported to have the vertical direction passing the center of the optical axis as a pivot axis. A voice coil motor and an angle detector are arranged at an end portion of the glass plate in the horizontal direction passing the center of the optical axis, and a current is supplied to the voice coil motor to attain a desired optical axis angle. The VAP is arranged at the side, closest to an object, in the image pick-up optical system. When the camera pivoting mechanism is omitted in this manner, the two cameras can be juxtaposed without forming any gap therebetween, and the apparatus can be rendered further compact.

Figures 9, 9A:
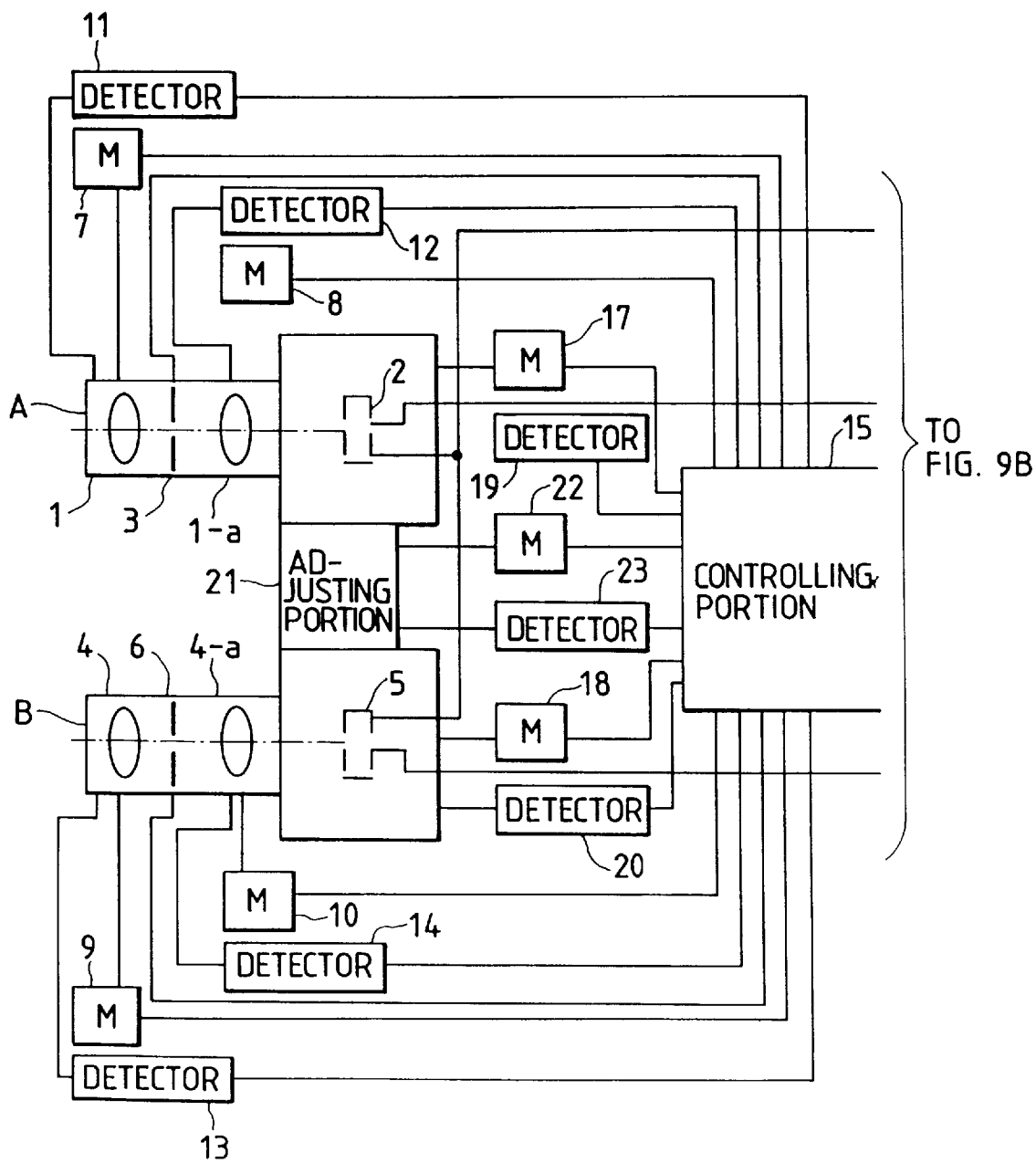
FIG. 9 is comprised of FIG. 9A and FIG. 9B showing block diagrams illustrating another embodiment of the multi-eye image pick-up apparatus according to the present invention.
Figure 9B:
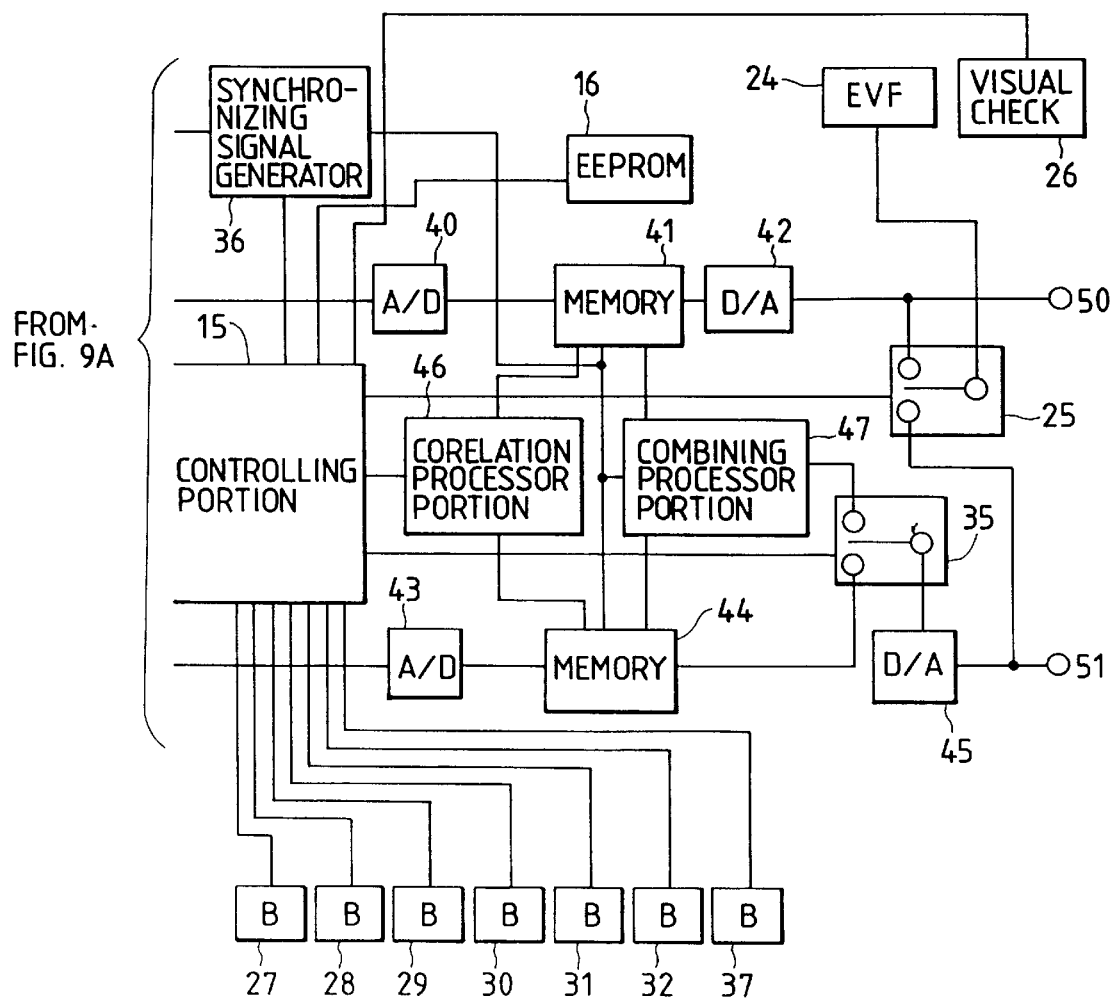

FIGS. 9A and 9B show the arrangement of another embodiment of the multi-eye image pick-up apparatus according to the present invention.

First and second video camera portions A and B are arranged substantially parallel to each other in substantially the same direction, and are integrated via a combining means C (see FIG. 1). Each of the first and second video camera portions A and B is constituted by a main body portion, an optical portion, and an electrical circuit portion inside the main body, and a semiconductor element using a CCD is used as an image pick-up element. The main bodies have connector portions 50 and 51 for supplying image pick-up outputs corresponding to the video cameras to corresponding memorizing devices such as VTRs, receiving a power supply voltage from an external device, and supplying remote control signals. In this multi-eye image pick-up apparatus, a view finder 24 for displaying an image pick-up output from one video camera is provided to the combining means C.

In order to stereoscopically observe images picked up by the first and second video camera portions A and B, the images from the two video camera portions must be caused to overlap each other on a screen or the screen of a cathode ray tube. In addition, a stereoscopic effect must be obtained when the images overlap each other. For this purpose, an image pick-up operation must be performed by crossing the optical axes of the first and second video camera portions A and B on the object side. Note that the relationship between the crossing position of the optical axes of the two cameras and the position of the object largely influences the stereoscopic effect. For example, when the crossing position coincides with the object position, the display position of a stereoscopic image almost coincides with the screen surface. However, if the crossing position is located in front of the object, the display position of the stereoscopic image is present behind the screen. Conversely, when the crossing position is located behind the object, the display position of the stereoscopic image is present in front of the screen, and corresponds to a position projected from the screen.

In order to properly obtain the stereoscopic effect, the crossing position of the optical axes of the first and second video camera portions A and B must be adjusted in correspondence with the distances between the object and the cameras. The multi-eye image pick-up apparatus of the present invention is achieved in consideration of this respect. In the multi-eye image pick-up apparatus of the present invention, not only a stereoscopic image pick-up operation but also a panoramic image pick-up operation can be realized by switching a switch, as will be described later.

The arrangement of a multi-eye image pick-up camera according to the present invention will be described in detail below with reference to FIGS. 9A and 9B.

Referring to FIGS. 9A and 9B, light for the right eye is picked up by an image pick-up element 2 in the right video camera portion A via a lens group 1, and is output as a right-eye video signal. On the other hand, light for the left eye is picked up by an image pick-up element 5 in the left video camera portion B via a lens group 4, and is output as a left-eye video signal. The right- and left-eye video signals are respectively output to the output terminals 50 and 51 via processing to be described later.

As motors for driving the lens groups 1 and 4, zooming and focusing motors are arranged in the right and left cameras, i.e., a right zooming motor 7, a right focusing motor 8, a left zooming motor 9, and a left focusing motor 10 are arranged. The lens groups 1 and 4 respectively have diaphragms 3 and 6 for adjusting the light-receiving amounts on the corresponding image pick-up elements. Also, position detectors 11, 12, 13 and 14 are arranged to detect the positions of lenses driven by the zooming motors and the focusing motors, and outputs from these detectors are input to a controlling portion 15. An EEPROM 16 memorizes variations in sensitivity of the image pick-up elements, individual differences of the right and left lens groups, and initial values of the angle and interval between the two cameras in the manufacture of the apparatus, as will be described later.

Furthermore, right and left convergence angle motors 17 and 18 for pivoting the corresponding cameras in the horizontal direction to have the light-receiving surfaces of the image pick-up elements 2 and 5 as almost the pivot centers are arranged. The right and left cameras respectively comprise rotational angle detectors 19 and 20, and the outputs from these detectors are input to the controlling portion 15. The right video camera portion A comprises an adjusting portion 21 for adjusting the interval between the right and left cameras, an adjusting motor 22 for driving the adjusting portion 21, and an interval detector 23 for detecting the interval between the right and left cameras. The output from the detector 23 is input to the controlling portion 15.

The image pick-up elements 2 and 5 are synchronously driven by a synchronizing signal generator 36, and analog video signals output from the two elements are respectively input to A/D converters 40 and 43 for converting the input signals into digital video signals via amplifiers (not shown). The digital video signals output from the A/D converters 40 and 43 are respectively memorized in image memories 41 and 44 whose read/write accesses are controlled by the synchronizing signal generator 36, and an image correlation processor portion 46 performs an image correlation calculation on the basis of the digital video signals memorized in the image memories 41 and 44. The calculation result of the image correlation processor portion 46 is input to the controlling portion 15, and is used for changing read addresses from the memories or the time base. An image combining processor portion 47 combines images based on the calculation result obtained by the image correlation processor portion 46 in a panoramic image pick-up mode. D/A converters 42 and 45 respectively convert digital signals output from the image memories 41 and 44 or the image combining processor portion 47 into analog video signals. As a signal to be output to the D/A converter 45, one of signals output from the image memory 44 and the image combining processor portion 47 is selected by a stereoscopic-panoramic selection SW 35.

The view finder 24 can display analog video signals obtained via the D/A converters 42 and 45. The view finder 24 is pivotally attached to the combining means C. Since the view finder 24 is pivoted through 180° to move the eyepiece portion of the view finder 24 to the opposite side of the camera main body, the view finder 24 can be observed not only by the right eye but also by the left eye. When the view finder 24 is pivoted through 180°, it is vertically inverted. However, the view finder can be rotated by a mechanism (not shown), and no problem is posed.

Furthermore, in a stereoscopic image pick-up mode, a signal to be output to the view finder 24 can be selected from one of the signals from the right and left video camera portions A and B using a main camera selection SW 25. More specifically, when a photographer looks into the view finder 24 with his or her right eye, the right camera can be selected as the main camera; otherwise, the left can be selected as the main camera. In a panoramic image pick-up mode, in this embodiment, since the main camera is switched to the left camera, a panoramic image combined based on signals picked up by the right and left cameras can be observed via the view finder 24. The view finder 24 comprises a visual axis detector 26, and can detect a visual axis position.

The camera main body comprises, as operation buttons or SWs, a camera standby button 27, a zooming operation button 28, an object selection button 29, an object tracking button 30, a status memorizing button 31, the stereoscopic-panoramic selection SW 35, and an initial state selection SW 32. The initial state selection SW 32 sets a camera state in a camera standby mode as an initial state, or memorizes a camera state upon depression of the status memorizing button 31, and automatically restores the memorized state in the standby mode.

A zoom focusing system in this embodiment will be described below.

This embodiment adopts a rear focusing type lens system, and a focusing lens 1-a has both a function of a correction lens for correcting movement of a focal plane upon a change in focal length, and a function of a focusing lens. More specifically, in a lens system of this type, since the correction lens also serves as a focusing lens, the moving locus of the correction lens varies depending on the object distance during zooming. Thus, a plurality of focusing lens moving loci are memorized in the controlling portion 15, and a locus is selected in corresponding with the object distance, thereby moving the focusing lens 1-a.

Since a difference in field angle, a shift in optical axis upon zooming, and a shift in focusing timing caused by, e.g., variations of the right and left lens groups may present shortcomings of the multi-eye image pick-up system, correspondence data of right and left zoom lens positions for setting the same field angles, and correspondence data of distances to an object and right and left focusing lens positions at that time are written in the EEPROM 16 in the manufacture of the apparatus.

A focusing operation executed in this embodiment will be described below.

In the multi-eye image pick-up apparatus of this embodiment, as a method of an automatic focusing point adjusting device, a hill-climbing method of those for attaining focusing point adjustment by directly evaluating a video signal from an image pick-up element is adopted. The hill-climbing method is popularly used since it has high in-focus accuracy, and does not require any special-purpose sensor.

Figure 10:
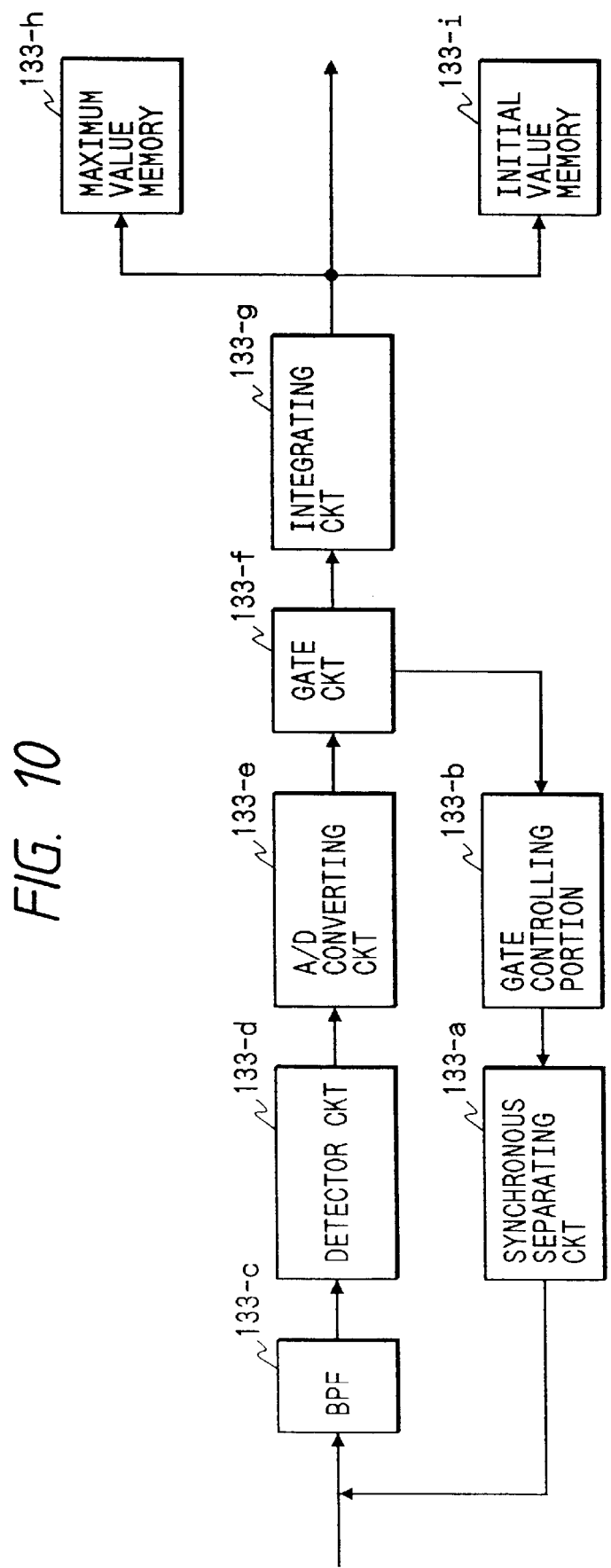
FIG. 10 is a block diagram showing the arrangement of a focusing arithmetic circuit according to the present invention.

FIG. 10 is a block diagram showing the arrangement of a focusing arithmetic circuit 133 based on the hill-climbing method. In this case, a description will be given for the right video camera portion A. However, since the same applies to the left video camera portion B, a detailed description therefor will be omitted.

A luminance signal is filtered through a band-pass filter (BPF) 133-c, and only a high-frequency component (e.g., 1 MHz) is separated. The separated high-frequency component is amplitude-detected by a detector circuit 133-d. The detection output is converted by an A/D converting circuit 133-e into a digital value, and a gate circuit 133-f extracts only a signal in a focus area set at the center of the screen from the digital value. The extracted signal is integrated by an integrating circuit 133-g in units of fields of a video signal, thus obtaining a focusing point evaluation value of the current field. At this time, vertical and horizontal synchronizing signals extracted from the luminance signal by a synchronous separating circuit 133-a are input to a gate controlling portion 133-b. The gate controlling portion 133-b is controlled by the controlling portion 15, so that a focus area can be set at a plurality of positions in the screen. For example, the gate controlling portion 133-b supplies a gate enable/disable signal to the gate circuit 133-f so as to set a rectangular focus area at the central portion of the screen and to allow passage of the luminance signal within only the range of this area. In this manner, the integrating circuit 133-g always outputs a focusing point evaluation value for one field.

The focusing operation of the multi-eye image pick-up apparatus according to this embodiment will be described below.

Figures 11, 11A:
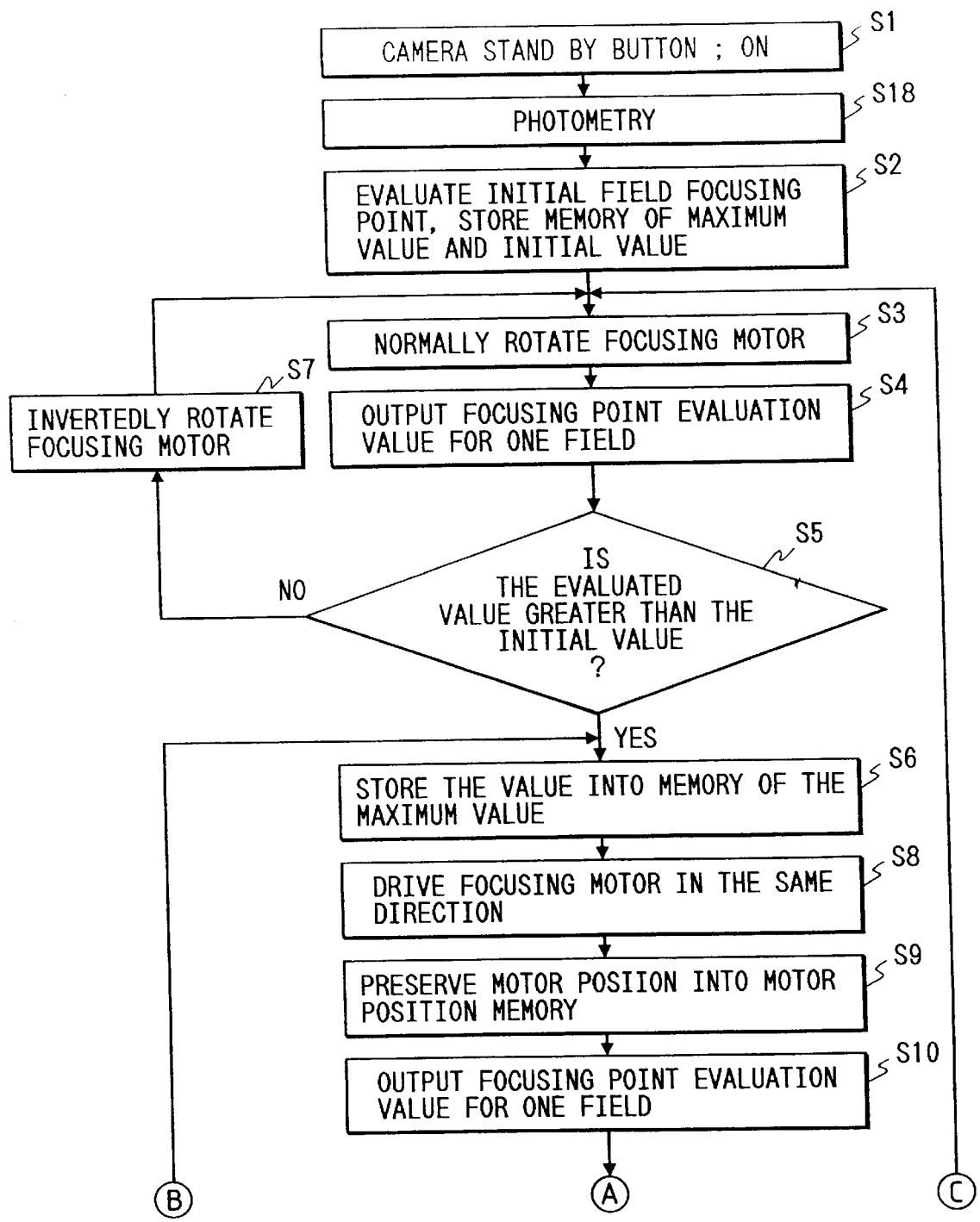
FIG. 11 is comprised of FIG. 11A and FIG. 11B showing flow charts for explaining a focusing operation according to the present invention.
Figure 11B:
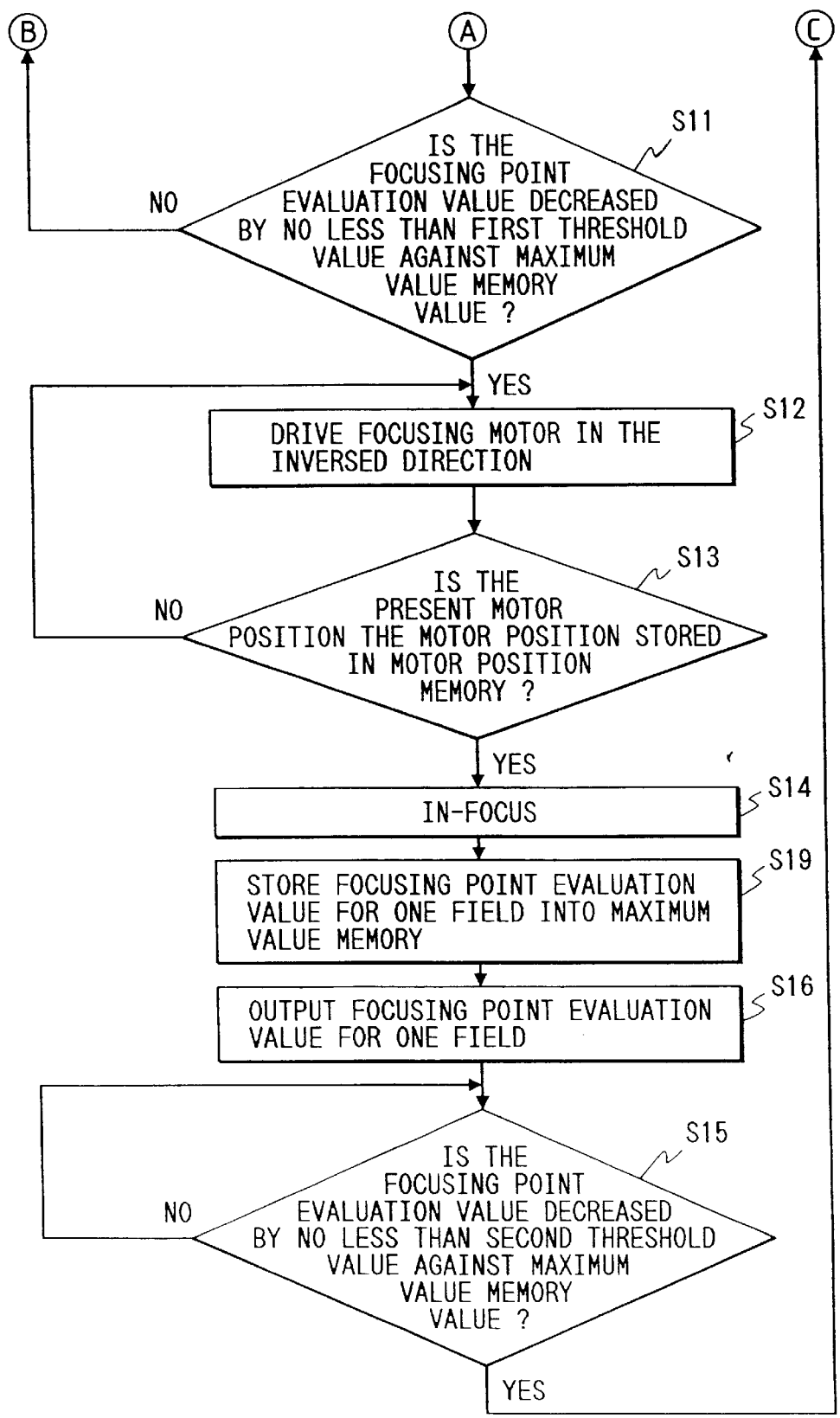

FIGS. 11A and 11B are flow charts showing the operation of this embodiment. The actual focusing operation of the apparatus of this embodiment will be described below with reference to FIGS. 11A and 11B.

When the camera standby button is turned on (step S1), an object luminance is measured by a photometry device (not shown) (step S18), and an electronic shutter speed of the photoelectric conversion means suited for the focusing means based on the hill-climbing method and an image pick-up operation is calculated. Thereafter, a focusing operation is started.

Immediately after the beginning of the focusing operation, a first focusing point evaluation value is held in a maximum value memory 133-h and an initial value memory 133-i (step S2). Thereafter, the controlling portion 15 rotates the right focusing motor 8 using a stepping motor in a predetermined direction to displace the focusing lens 1-a in the optical axis direction (step S3). The focusing arithmetic circuit 133 outputs a focusing point evaluation value obtained after the right focusing motor is driven (step S4), and compares it with the initial evaluation value held in the initial value memory 133-i, thus outputting a comparison result.

The focusing arithmetic circuit 133 compares the maximum focusing evaluation value so far held in the maximum value memory 133-h with the present evaluation value, and outputs a comparison signal indicating one of two states, i.e., whether the present evaluation value is larger than the contents of the maximum value memory 133-h (first mode) or the present evaluation value decreases by not less than a first threshold value from the contents of the maximum value memory 133-h (second mode).

The controlling portion 15 rotates the right focusing motor 8 in the initial direction until the focusing arithmetic circuit 133 generates an output indicating an increase or decrease in evaluation value. When such an output is generated, the controlling portion 15 determines the rotational direction of the motor in correspondence with the contents of the output (step S5). When the output indicates that the present focusing point evaluation value is larger than the initial evaluation value, the controlling portion 15 maintains the initial rotational direction; when the output indicates that the present focusing point evaluation value is smaller than the initial evaluation value, the controlling portion reverses the rotational direction of the focusing motor. Thereafter, the controlling portion 15 monitors the output from the focusing arithmetic circuit 133 in the same manner as described above (step S7).

The value of the maximum value memory 133-h is updated based on the output from the integrating circuit 133-g when the present evaluation value is larger than the contents of the maximum value memory 133-h, and the maximum value memory 133-h always holds the maximum value of the focusing point evaluation values so far (step S6). Thereafter, the focusing motor is driven in the same direction (step S8), as described above.

A motor position detection circuit 12 shown in FIG. 9A comprises an up-down counter, which is reset at the beginning of the focusing operation, and counts up or down the number of steps of the right focusing motor 8 using a stepping motor as a positive value in the near-point direction and as a negative value in the far-point direction. The motor position detection circuit 12 also serves as a position memory for memorizing the motor position, and its contents are updated, so that the circuit 12 always holds the motor position corresponding to the maximum evaluation value on the basis of the output from the controlling portion 15 as in the maximum memory 133-h (step S9).

The controlling portion 15 monitors the output from the focusing arithmetic circuit 133 (step S10) while rotating the right focusing motor 8 in the direction determined based on the output from the focusing arithmetic circuit 133. Simultaneously as the output from the circuit 133 indicates the second mode, i.e., that the focusing point evaluation value decreases by not less than the first threshold value (M) as compared to the maximum value (step S11), the controlling portion 15 rotates the right focusing motor 8 in the reverse direction (step S12).

Upon reversal of the rotational direction of the right focusing motor 8, the moving direction of the focusing lens 1-a is changed from a direction to approach the image pick-up element 2 to a direction to separate from the element 2 or vice versa.

After the rotational direction of the motor is reversed, the motor position corresponding to the maximum evaluation value, which position is held in the motor position detection circuit 12, is compared with the present motor position by the controlling portion 15 (step S13). When the two positions coincide with each other, i.e., when the focusing lens 1-a returns to a position corresponding to the maximum focusing point evaluation value, the controlling portion 15 outputs a lens stop signal for stopping the right focusing motor 8, and the focusing lens 1-a stops, thus attaining an in-focus state (step S14).

FIG. 12 shows a change in lens position in the above-mentioned hill-climbing focusing operation.

As described above, when the focusing operation is finished, and the lens stop signal is generated, the focusing point evaluation value at that time is held in the controlling portion 15 (step S19). The controlling portion 15 monitors the output from the focusing arithmetic circuit 133 (step S16), and compares the held contents with the present focusing point evaluation value. When the present evaluation value decreases by not less than a predetermined second threshold value as compared to the held contents, the controlling portion 15 determines that an object has changed, and restarts the hill-climbing focusing operation to track the change in object (step S15).

As described above, the focusing means based on the hill-climbing method can cope with a change in object in real time and has high in-focus accuracy since it executes the focusing operation by comparison of the imaging state on the surface of the photoelectric conversion element in units of fields.

A visual axis detection system of this embodiment will be described below.

In this embodiment, the view finder 24 comprises the visual axis detector. As a method of detecting a visual axis, for example, in Japanese Laid-Open Patent Application No. 61-172552, a collimated light beam from a light source is projected onto a front eye portion of the eyeball of an observer, and the visual axis is obtained by utilizing a cornea reflection image based on light reflected by the cornea and the imaging position of the pupil.

Figure 13A:
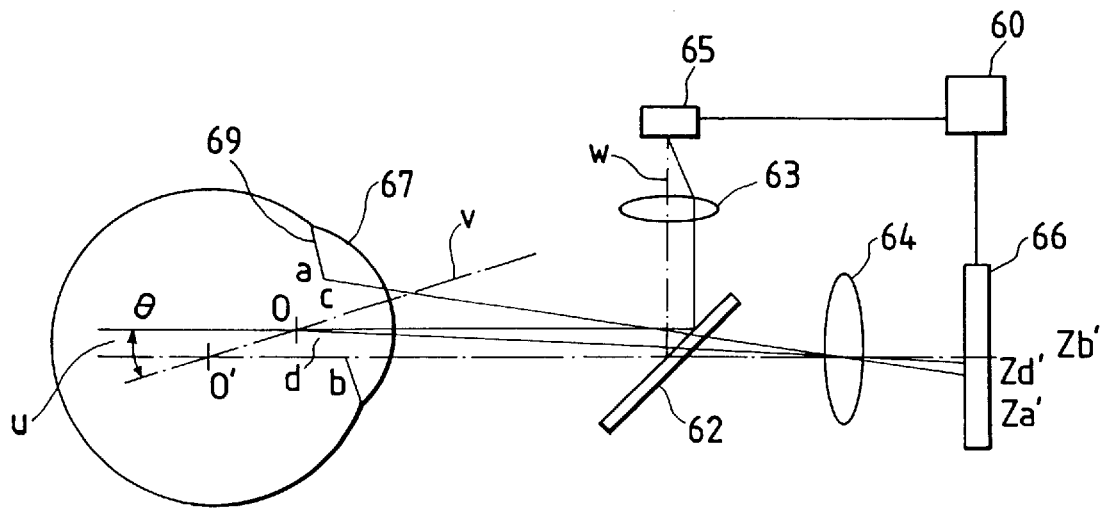
FIGS. 13A and 13B are views for explaining the principle of visual axis detection.
Figure 13B:
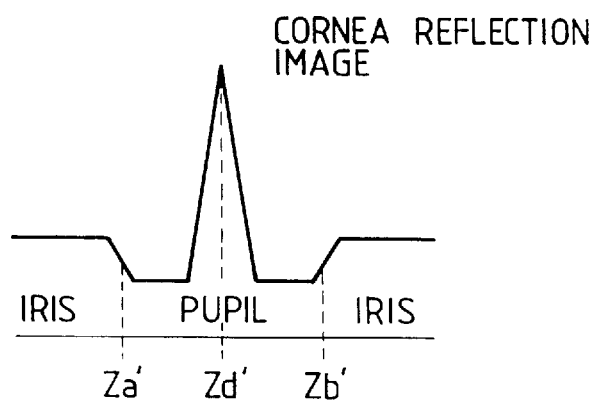

FIGS. 13A and 13B are views for explaining the principle of visual axis detection. FIG. 13A is a schematic view of a visual axis detection optical system, and FIG. 13B is an output intensity chart of a photoelectric element array 66.

Referring to FIG. 13A, a light source 65 such as a light-emitting diode for emitting infrared light which cannot be sensed by an observer is arranged on the focal plane of a projection lens 63. Infrared light emitted from the light source 65 is converted into collimated light by the projection lens 63, and the collimated light is reflected by a half mirror 62 to illuminate a cornea 67 of the eyeball. A cornea reflection image (virtual image) d formed by some light components of the infrared light reflected by the surface of the cornea 67 is transmitted through the half mirror 62, and is focused by a light-receiving lens 64 to be projected at a position Zd' on the photoelectric element array 66. Light beams from edge portions a and b of an iris 69 form images of edge portions a' and b' at positions Za' and Zb' on the photoelectric element array 66. When a rotational angle θ of an optical axis v of the eyeball with respect to the optical axis (u) of the light-receiving lens 64 is small, if the Z-coordinates of the edge portions a and b of the iris 69 are respectively represented by Za and Zb, a coordinate Zc of a central position c of the pupil is given by:

$$Zc \approx (Za+Zb)/2$$

Since the Z-coordinate of the cornea reflection image d coincides with that of a center O of curvature of the cornea 67, if the Z-coordinate of the generation position d of the cornea reflection image is represented by Zd and the distance between the center O of curvature of the cornea 67 and the center c of the pupil is represented by Oc, the rotational angle θ of the optical axis v of the eyeball satisfies a relation:

$$Oc \times SIN\ \theta \approx Zc-Zd \tag{1}$$

For this reason, when an arithmetic processor device 60 detects the positions of feature points (the cornea reflection image d and the edge portions a and b of the iris) projected onto the photoelectric element array 66, as shown in FIG. 13B, the rotational angle θ of the optical axis v of the eyeball can be calculated. At this time, relation (1) is rewritten as:

$$\gamma \times Oc \times SIN\ \theta \approx (Za'+Zb')/2-Zd' \tag{2}$$

where γ is the magnification determined by the position of the eyeball with respect to the light-receiving lens 64.

Furthermore, when the rotational angle θ of the eyeball optical axis of the observer is calculated, the visual axis of the observer can be obtained by correcting the optical axis of the eyeball and the visual axis.

FIGS. 13A and 13B exemplify a case wherein the eyeball of the observer is rotated in the Z-X plane (e.g., the horizontal plane). However, the same detection method can be applied even when the eyeball of the observer is rotated in the X-Y plane (e.g., the vertical plane).

The operation of the multi-eye image pick-up apparatus according to this embodiment will be described below.

In this embodiment, the image pick-up mode can be selected using the stereoscopic-panoramic selection SW 35, and the stereoscopic image pick-up mode and the panoramic image pick-up mode will be described in turn below.

Figure 14:
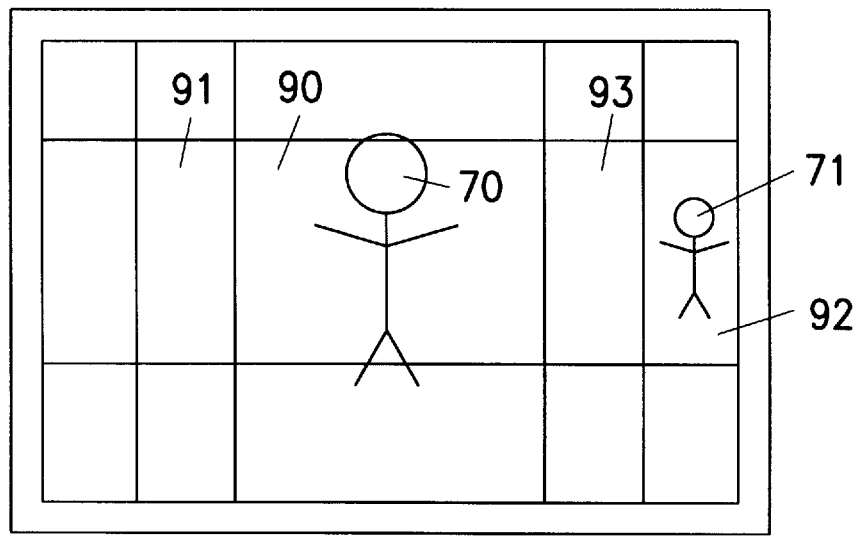
FIG. 14 is a view showing focusing areas in a stereoscopic image pick-up mode.

FIG. 14 shows focus areas in the stereoscopic image pick-up mode, and the screen is divided into 3×5 focus areas. A focus area 90 at the central portion of the screen is set to be wider than peripheral areas in consideration of the fact that an object is normally set at the center. The focus area 90 at the central portion of the screen is determined as one in an initial state.

When the camera standby button 27 is depressed, an initializing operation is performed first. More specifically, after the zoom optical systems of the two cameras are set to have initial values, the adjusting motor 22 is driven so that the interval between the two cameras has a predetermined initial value. Thereafter, the two cameras are driven, so that the two cameras extend perpendicular to a line connecting their centers of rotation and parallel to each other. These initializing operations are performed based on angle offset values which are measured from reference values of the angle detectors 19 and 20 in the manufacture of the apparatus so as to attain the above-mentioned state, and are written in the EEPROM 16.

Thereafter, based on a luminance signal in the focus area 90 of the image pick-up screen of, e.g., the right video camera portion A, which is selected by the main camera selection SW 25, the focusing operation is performed by the hill-climbing method, and a distance l0 to an object is read out from the EEPROM 16 on the basis of the value of the position of the focusing lens 1-a detected by the position detection circuit 12 at that time.

Figure 15:
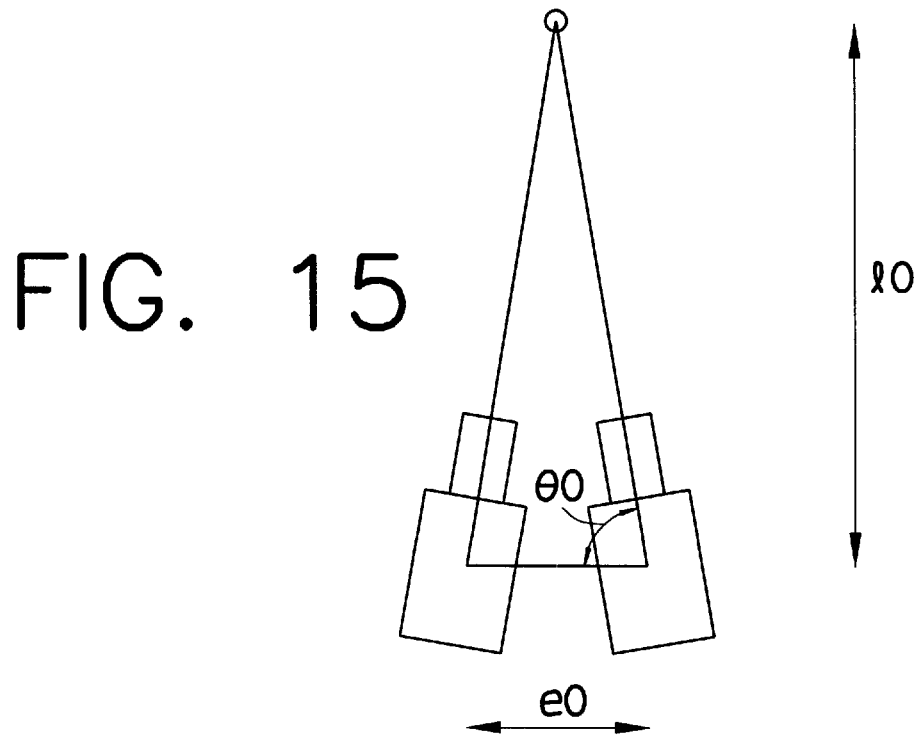
FIG. 15 is a view for explaining an operation for setting an initial camera angle in the stereoscopic image pick-up mode.

As shown in FIG. 15, if the measurement result is represented by l0 and the cameras' interval is represented by e0, the camera angle θ0 is given by:

$$\theta 0 = ATAN(2 \times l0/e0)$$

(ATAN represents an inverse function of TAN; the same applies to the following description)

The controlling portion 15 directs the two cameras toward an object. More specifically, the cameras are automatically directed toward an object located on the perpendicular bisector of a line connecting the pivot centers of the two cameras, and are driven to perform the focusing operation again. At this time, since the right and left cameras are symmetrically arranged and have the same distance to an object, the focusing operation of the left video camera portion B is performed synchronously with that of the right video camera portion A. More specifically, the controlling portion 15 supplies the same driving command as that for the right focusing motor 8 to the left focusing motor 9. With this driving method, the focusing operations of the right and left cameras can be executed at the same timing, and no disturbing feeling is experienced by an observer.

In this embodiment, a cameras' interval of at most about 10 cm is assumed. For this reason, no problem is posed even when an object facing the right video camera portion A is used as one on the perpendicular bisector. If a larger-scale system, e.g., a system in which the two cameras are separated by several tens of centimeters or more, is assumed, even an object facing the camera cannot often be set in the focus area 90. In such a case, that is, when infinity is determined in the focusing operation using the focus area 90, the focusing operation is performed by moving the focus area in a direction to be closer to the other camera, e.g., to a focus area 91, thus solving the above-mentioned problem. As another method, when infinity is determined in the focusing operation using the focus area 90, the focusing operation may be executed while driving the zoom lenses of the right and left cameras toward the wide-angle side. Furthermore, when infinity is determined in the focusing operation using the focus area 90, the focusing operation may be performed by pivoting the right and left cameras in a direction to increase the crossing angle (convergence angle) between the optical axes of the cameras.

Upon completion of the initializing operation in the stereoscopic image pick-up mode, an actual image pick-up state is set. Even when an object moves within an in-focus range during the image pick-up operation, the convergence angle of the cameras is not changed. However, when an object or the cameras moves and a re-focusing operation is required, the left video camera portion B is driven in synchronism with the focusing operation of the right video camera portion A, and the convergence angle is changed based on distance information obtained in the focusing operation.

Since an object is not always located near the center of the screen, an object is selected in such a case by utilizing visual axis detection in this embodiment.

Object selection will be described below with reference to FIG. 16.

Figures 16, 17:
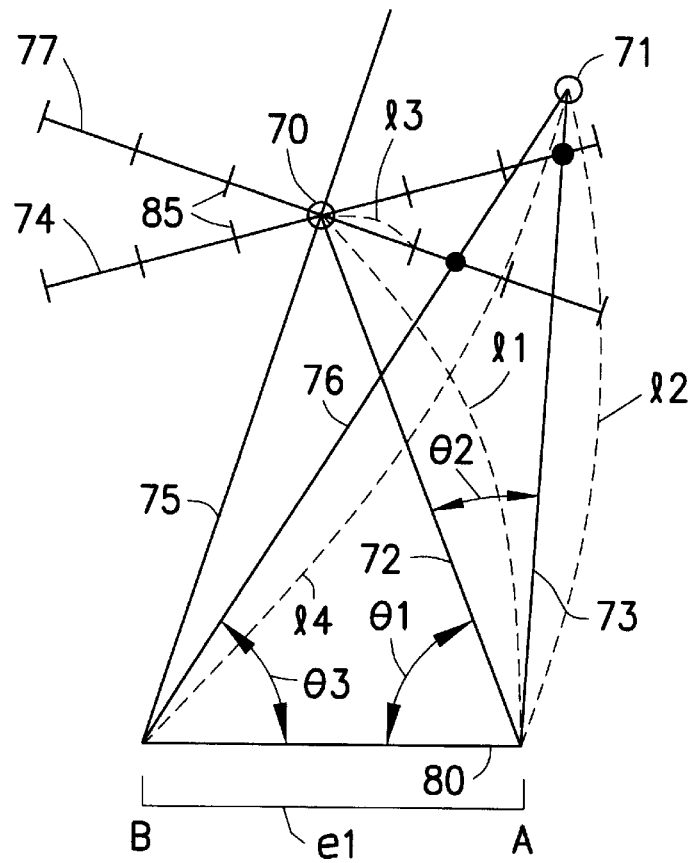
FIG. 16 is a view for explaining a focusing operation and control of the convergence angle executed when visual axis detection is adopted in the embodiment shown in FIGS. 9A and 9B.
FIG. 17 is a view showing focusing areas in a panoramic image pick-up mode.

FIG. 16 illustrates the relationship among the right and left video camera portions A and B and objects. Assume that lines respectively connecting objects 70 and 71 with the right video camera portion A are represented by 72 and 73, and a line passing the object 70 and perpendicular to the line 72 is represented by 74. Also, assume that lines respectively connecting the objects 70 and 71 with the left video camera portion B are represented by 75 and 76, and a line passing the object 70 and perpendicular to the line 75 is represented by 77. Lines 85 dividing the lines 74 and 77 into a plurality of line segments correspond to the above-mentioned focus areas. Assume that the object 70 is located at a position where the optical axes of the right and left cameras cross each other, and the cameras are presently focused on the object 70. In addition, assume that a line connecting the centers of rotation of the right and left video camera portions A and B is represented by 80, the distance between the centers is represented by e1, the distance between the right or left video camera portion A or B and the object 70 (assumed to be located on the perpendicular bisector of the line 80) is represented by l1, the distance between the right video camera portion A and the object 71 is represented by l2, the distance between the center of screen (the object 70 in FIG. 16) and an intersection 79 between the lines 76 and 77 is represented by l3, the distance between the left video camera portion B and the object 71 is represented by l4, the angle formed by the line 80 and the line 72 or 75 is represented by $\theta 1$, the angle formed by the lines 73 and 72 is represented by $\theta 2$, and the angle formed by the lines 76 and 80 is represented by $\theta 3$. In this case, the angle $\theta 3$ and the distance l3 are respectively given by:

$$\theta 3 = \text{ATAN}(l2 \times \text{SIN}(\theta 1 + \theta 2)/(e1 + l2 \times \text{COS}(\theta 1 + \theta 2))) \quad (1)$$

$$l3 = l1 \times \text{TAN}(\theta 1 - \theta 2) \quad (2)$$

$$l3 = l2 \times \text{SIN}(\theta 1 + \theta 2)/\text{SIN } \theta 3 \quad (3)$$

When the distance l3 is detected, a focus area corresponding to the object 71 in the left video camera portion B can be determined.

Note that the distance e1 is data obtained from the interval detector of the adjusting portion 21, the distance l1 is obtained by reading out distance information corresponding to the position of the focusing lens 1-a in an in-focus state from the EEPROM 16, the angle $\theta 1$ is obtained from the angle detector 19 or 20, and the angle $\theta 2$ is obtained from the visual axis detector 26. If the object 71 is present in a focus area 82 in FIG. 14, a photographer selects the object 71 by depressing the object selection button 29 while gazing the object 71.

The controlling portion 15 determines based on a correspondence between the visual axis position at that time and a focus area that a focus area 92 is selected, and issues a command to the gate controlling portion 133-b in the focusing arithmetic circuit 133 to execute the focusing operation on the basis of information of the luminance signal in the focus area 92. As a result, the controlling portion 15 can acquire the distance l2. Therefore, l1, l2, $\theta 1$, and $\theta 2$ are obtained, and l3 and l4 are calculated from the above equations. Thus, a focusing lens 4-a of the left video camera portion B is driven to a position corresponding to l4, and the focusing operation is performed using a focus area 93 of the left video camera portion B, which area is obtained based on l3 and corresponds to the object 71.

At this time, the focus area, corresponding to the object 71, of the left video camera portion B, and the distance l4 between the left video camera portion B and the object 71 can be obtained only after the distance between the right video camera portion A and the object 71 is acquired by the focusing operation. For this reason, it is impossible to perform the focusing operations of the right and left cameras at the same timing. However, since the focusing operation is started after the focusing lens 4-a is driven to the position corresponding to the distance l4 to an object, a shift between focusing timings can be minimized.

In the apparatus of this embodiment, an object detected based on the visual axis can be automatically moved to the center of the screen by depressing the object tracking button 30 in the stereoscopic image pick-up mode. When a photographer depresses the object selection button 29 while gazing an object in the finder 24, the controlling portion 15 determines based on a correspondence between the visual axis position at that time and a focus area that the focus area 92 is selected, and issues a command to the gate controlling portion 133-b in the focusing arithmetic circuit 133. As a result, the focusing operation is performed on the basis of information of the luminance signal in the focus area 92, thus acquiring l2. Therefore, l1, l2, $\theta 1$, and $\theta 2$ are obtained, and l3 and l4 are calculated from the above equations. Thus, the focusing lens 4-a of the left video camera portion B is driven to a position corresponding to l4, and the focusing operation is performed using the focus area 93 of the left video camera portion B, which area is obtained based on l3 and corresponds to the object 71. After both the cameras are focused on the object 71, the right and left video camera portions A and B are rotated clockwise on the basis of the angles $\theta 2$ and $\theta 3$. In this manner, the object 71 automatically moves to the center of the screen. At this time, since the object 71 is located in the focus area 90, both the right and left cameras monitor the in-focus state in the focus area 90.

Picked-up stereoscopic image signals are temporarily memorized in the image memories 41 and 44, and a vertical offset between right and left images or the like is corrected by the image correlation processor portion 46. Thereafter, the image signals are output via the D/A converters 42 and 45.

The operation in the panoramic image pick-up mode of this embodiment will be described below.

FIG. 17 shows focus areas corresponding to the right video camera portion A in the panoramic mode. A focus area 95 is a focus area in an initial state, and is set to be an overlapping region between right and left image pick-up areas.

In a panoramic image pick-up mode, the two cameras are set to be pivoted symmetrically about the perpendicular bisector of a line connecting the centers of rotation of the two cameras, and are initialized when the camera standby button 27 is turned on. More specifically, the two cameras are driven, so that they extend perpendicular to the line connecting their centers of rotation and parallel to each other in the same manner as in a case wherein the stereoscopic image pick-up mode is selected. Thereafter, the focusing operation is performed based on a luminance signal in the focus area 95 of the image pick-up screen of the right video camera portion A.

In the above-mentioned focusing operation, since the right and left cameras are symmetrically arranged, and the distances between the right and left cameras and an object are equal to each other, the focusing operation of the left video camera portion B is performed in synchronism with that of the right video camera portion A. More specifically, the controlling portion 15 supplies the same driving command as that to the right focusing motor 8 to the left focusing motor 9. In this case, the right and left cameras can be driven at the same focusing timing by the above-mentioned driving method, and no disturbing feeling is presented to an observer. In addition, one of a plurality of aspect ratios can be selected by an aspect ratio changing button 37, and the overlapping degree of images picked up by the two cameras is determined by the selected aspect ratio.

Figure 18:
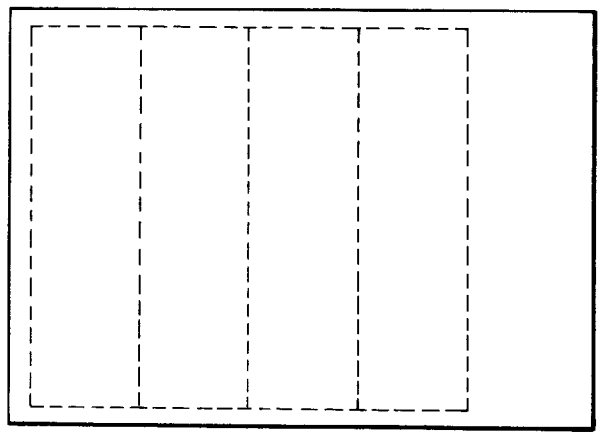
FIG. 18 is a view for explaining selection of aspect ratios in the panoramic image pick-up mode.

FIG. 18 shows a region in the right video camera portion A, which overlaps that in the left video camera portion B, and the region can be changed in four steps (from type I to type IV). At this time, the relationship between the focus area and the overlapping region is as follows. That is, the focus area is always set in the overlapping region (e.g., type I is set in the focus area 95 and type II is set in a focus area 96). When the distance to an object is sufficiently larger than the cameras' interval, a ratio κ of a field angle of the overlapping region to the field angle of each of the two cameras is given by:

$$\kappa = 1/(1+\text{TAN }\alpha \times \text{TAN}(\alpha+\beta))/(2\times((1/(1+\text{TAN }\alpha \times \text{TAN}(\alpha-\beta))-(\cos \alpha)^2)) \quad (4)$$

where α is the camera angle from the initial state of the panoramic image pick-up mode of the camera, and β is an angle half the horizontal field angle determined by the zoom magnification. As can be understood from the above equation, the ratio κ is determined by the zoom magnification and the camera angle independently of the object distance. Conversely, when the ratio κ is selected and the zoom magnification at that time is known, the camera angle can be calculated from equation (4). For example, when type II is selected, the camera angle corresponding to the selected overlapping region is calculated, and the two cameras are pivoted to perform a focusing operation in the focus area 96.

Note that the focus area can use any region as long as it falls within the overlapping region, and the focusing operation may be performed using the entire overlapping region determined based on the aspect ratio as the focus area.

In this case, if an in-focus state is attained using only the focus area corresponding to the overlapping region, when an image of another object other than a background, which object is present in front of an object to be focused, is to be picked up together, the image of the other object is picked up in an out-of-focus state. In such a case, when an observer depresses the object selection button 29 while gazing an object to be focused, a focus area corresponding to the visual axis (e.g., a focus area 97) is selected on the basis of the output from the visual axis detector 26 to perform a focusing operation, and the controlling portion 15 calculates a lens position and an aperture value, which can attain an in-focus state of both the background and object, on the basis of the results of focusing operations using the focus area 96 as an initial area, and the focus area 97 determined based on the visual axis. Then, the diaphragms and focusing lenses of the right and left cameras are driven. A series of lens driving operations are synchronously executed, and an offset between the right and left focusing timings can be eliminated.

When an object or the cameras moves and a re-focusing operation is required, the focusing operation is performed based on the signals from the designated focus areas 96 and 97 if the above-mentioned setting state is left unchanged. Furthermore, when an object moves to another focus area, the object selection button 29 is depressed again to perform the focusing operation on the basis of signals from a new focus area and the initial focus area.

Picked-up digital video signals are respectively memorized in the image memories 41 and 44, and the image correlation processor portion 46 performs the image correlation calculation on the basis of the digital video signals memorized in the image memories 41 and 44. In this case, the position of the overlapping region in the panoramic image pick-up mode with respect to the screen is measured by the matching method, and the two images are memorized in the image combining processor portion 47 to overlap each other at the measured position.

Image information memorized in the image combining processor portion 47 is larger than normal information for one screen, and data in the memory is larger than normal data in the horizontal direction. In order to display such information on a normal monitor, the read cycle by the synchronizing signal generator 36 is shortened. In order to set the same magnification in the horizontal and vertical directions, data can be read out by trimming the upper and lower portions of the screen in the vertical direction, and compressing or thinning out the data.

The output from the image combining processor portion 47 is switched by the stereoscopic-panoramic selection SW 35, and is output to the output terminal 51 via the D/A converter 45. Since the output from the D/A converter 45 is an analog video signal, it can be observed by the view finder 24. For this reason, the aspect ratio can be changed while observing an image via the view finder 24. When the aspect ratio changing button is depressed at that time, an image stored in the image combining processor portion 47 is output until the camera angle is set and the focusing operation is finished. For this reason, a noisy image during the camera operation is not output.

In this embodiment, the stereoscopic and panoramic image pick-up modes use different focus area patterns. However, the focus area patterns in the stereoscopic image pick-up mode may be set to be the same as those in the panoramic image pick-up mode.

What is claimed is:

1. A multi-eye image pick-up apparatus comprising:

a camera having first and second video camera portions;

initializing mode selecting means for selecting whether or not said camera is initialized when electrical power is applied to said camera whereby a stand-by state is attained;

image pick-up mode selecting means for selecting whether a stereo image pick-up is performed or a panorama image pick-up is performed by using said camera; and optical axis angle controlling means for controlling an angle formed by intersection of image pick-up optical axes of said first and second video camera portions, said optical axis angle controlling means having motors for making at least one of said first and second video camera portions rotate with respect to the other one of said first and second video camera portions so that said angle formed by said intersection of said image pick-up optical axes is changed, and said optical axis angle controlling means driving said motor so that said angle formed by said intersection of said image pick-up optical axes becomes a predetermined angle according to an image pick-up mode selected by said image pick-up mode selecting means when said camera lies in a stand-by state in a case where said initializing mode selecting means is set in the initializing side.

2. An apparatus according to claim 1, wherein said optical axis angle controlling means sets different optical axis angles in a stereoscopic image pick-up mode and a panoramic image pick-up mode.

3. A multi-eye image pick-up apparatus comprising:

a camera having first and second video camera portions;

a first focus motor for adjusting a focusing point state of said first video camera portion;

a second focus motor for adjusting a focusing point state of said second video camera portion;

focusing point detecting means for performing a focusing point detection for an area where image pick-up areas where said first and second video camera portions are overlapped when a panorama image pick-up mode is selected wherein image pick-up optical axes of said first and second video camera portions are not intersected before said camera;

controlling means for controlling drives of said first and second focus motors according to a detected result of said focusing point detecting means;

image correlation processing means for performing an image correlation process for each of pick-up images of said first and second video camera portions; and panorama image combining means for combining panorama images by using each of pick-up images of said first and second video camera portions according to a result obtained by said image correlation processing means.

4. An apparatus according to claim 3, wherein said focusing point detecting means detects the focusing state using an image signal from at least one of said first and second video camera portions.

* * * * *

UNITED STATES PATENT AND TRADEMARK OFFICE
CERTIFICATE OF CORRECTION

PATENT NO. : 5,864,360

DATED : January 26, 1999

INVENTOR(S) : Shigeki Okauchi and Sunao Kurahashi

It is certified that error appears in the above-identified patent and that said Letters Patent is hereby corrected as shown below:

Column 3, line 17, delete "body, a" and insert therefor -- body, and a --.

Column 6, line 38, delete "$Zc \cong (Za+Zb)/2$" and insert therefor -- $Zc \simeq (Za + Zb)/2$ --.

Column 6, line 48, delete "$OcxSIN\ \theta \cong Zc-Zd$" and insert therefor -- $Oc\ x\ SIN\theta \simeq Zc - Zd$ --.

Column 6, line 58, delete "$\Upsilon \times OcxSIN\ \theta \cong (Za'+Zb')/2 - Zd'$" and insert therefor -- $\Upsilon \times Oc \times SIN\theta \simeq (Za' + Zb')/2 - Zd'$ --.

Column 7, line 41, delete "by 10 and" and insert therefor -- by $\ell 0$ and --.

Column 7, line 44, delete "$\theta 0 = ATAN(2 \times 10/e0)$" and insert therefor -- $\theta 0 = ATAN(2 \times \ell 0/e0)$ --.

Column 9, line 14, delete "by 11, the" and insert therefor -- by $\ell 1$, the --.

Column 9, line 16, delete "by 12, the" and insert therefor -- by $\ell 2$, the --.

Column 9, line 18, delete "13, the angle" and insert therefor -- $\ell 3$, the angle --.

Column 9, line 24, delete "a distance 14," and insert therefor -- a distance $\ell 4$, --.

Column 9, line 30, delete "$14 = 12 \times SIN\ \theta 2$" and insert therefor -- $\ell 4 = \ell 2 \times SIN\theta 2$ --.

Column 9, line 32, delete "a distance 15," and insert therefor -- a distance $\ell 5$ --.

Column 9, line 37, delete "$15 = 13 \times SIN(\theta 1 - \theta 3)$" and insert therefor -- $\ell 5 = \ell 3 \times SIN(\theta 1 - \theta 3)$ --.

Column 9, line 43, delete "amount 16 is" and insert therefor -- amount $\ell 6$ is --.

Column 9, line 45, delete "$16 = 14 - 15$" and insert therefor -- $\ell 6 = \ell 4 - \ell 5$ --.

Column 9, line 52, delete "$\theta 4 = ATAN(16/(13 \times SIN(\theta 1 - \theta 3)))$" and insert therefor -- $\theta 4 = ATAN(\ell 6/(\ell 3 \times SIN(\theta 1 - \theta 3)))$ --.

UNITED STATES PATENT AND TRADEMARK OFFICE
CERTIFICATE OF CORRECTION

PATENT NO. : 5,864,360

DATED : January 26, 1999

INVENTOR(S) : Shigeki Okauchi and Sunao Kurahashi

It is certified that error appears in the above-identified patent and that said Letters Patent is hereby corrected as shown below:

Column 9, line 57, delete "distance 11 is" and insert therefor -- distance $\ell 1$ is --.

Column 9, line 61, delete "12 can" and insert therefor -- $\ell 2$ can --.

Column 9, line 63, delete "from 12, θ1," and insert therefor -- from $\ell 2$, θ1, --.

Column 9, line 67, delete "θ3=ATAN(12xSIN(θ1+θ2)/(e1+12xCOS(θ1+θ2)))" and insert therefor -- θ3 = ATAN($\ell 2$ x SIN(θ1 + θ2)/(e1 + $\ell 2$ x COS(θ1 + θ2))) --.

Column 10, line 1, delete "distance 13 is" and insert therefor -- distance $\ell 3$ is --.

Column 10, line 6, equation (4), delete "13=12xSIN(θ1+θ2)/SIN θ3" and insert therefor -- $\ell 3$ = $\ell 2$ x SIN(θ1 + θ2)/SIN θ3 --.

Column 10, line 12, delete "distance 12 between" and insert therefor -- distance $\ell 2$ between --.

Column 10, line 13, delete "θ3, 13, and" and insert therefor -- θ3, $\ell 3$, and --.

Column 10, line 14, delete "e1, 11, 12," and insert therefor -- e1, $\ell 1$, $\ell 2$, --.

Column 10, line 15, delete "12 and 13 are" and insert therefor -- $\ell 2$ and $\ell 3$ are --.

Column 11, line 20, delete "distance 12 to" and insert therefor -- distance $\ell 2$ to --.

Column 11, line 24, delete "to 13 and 12 obtained" and insert therefor -- to $\ell 3$ and $\ell 2$ obtained --.

Column 12, lines 6-7, equation (5), delete "κ=1/(1+TAN αxTAN(α+β))/(2x((1/(1+TAN αxTAN(α-β))-(COSα)²))" and insert therefor -- κ = 1/(1 + TANα x TAN(α + β))/(2 x ((1/(1 + TANα x TAN(α - β)) - (COSα)²)) --.

UNITED STATES PATENT AND TRADEMARK OFFICE
CERTIFICATE OF CORRECTION

PATENT NO. : 5,864,360

DATED : January 26, 1999

INVENTOR(S) : Shigeki Okauchi and Sunao Kurahashi

It is certified that error appears in the above-identified patent and that said Letters Patent is hereby corrected as shown below:

Column 18, line 67, delete "$Zc \cong (Za+Zb)/2$" and insert therefor -- $Zc \simeq (Za + Zb)/2$ --.

Column 19, line 10, equation (1), delete "$OcxSIN\ \theta \cong Zc-Zd$" and insert therefor -- $Oc \times SIN\theta \simeq Zc - Zd$ --.

Column 19, line 19, equation (2), delete " $\gamma xOcxSIN\ \theta \cong (Za'+Zb')/2-Zd'$ " and insert therefor -- $\gamma \times Oc \times SIN\theta \simeq (Za' + Zb')/2 - Zd'$ --.

Column 19, line 61, delete "distance 10 to" and insert therefor -- distance $\ell 0$ to --.

Column 19, line 66, delete "by 10 and" and insert therefor -- by $\ell 0$ and --.

Column 20, line 1, delete "$\theta 0 = ATAN(2 \times 10/e0)$" and insert therefor -- $\theta 0 = ATAN(2 \times \ell 0/e0)$ --.

Column 21, line 9, delete "by 11, the" and insert therefor -- by $\ell 1$, the --.

Column 21, line 11, delete "12, the" and insert therefor -- $\ell 2$, the --.

Column 21, line 13, delete "by 13, the" and insert therefor -- by $\ell 3$, the --.

Column 21, line 14, delete "by 14, the" and insert therefor -- by $\ell 4$, the --.

Column 21, line 19, delete "distance 13 are" and insert therefor -- distance $\ell 3$ are --.

Column 21, line 21, equation (1), delete "$\theta 3 = ATAN(12 \times SIN(\theta 1+\theta 2)/(e1+12 \times COS(\theta 1+\theta 2)))$" and insert therefor -- $\theta 3 = ATAN(\ell 2 \times SIN(\theta 1 + \theta 2)/(e1 + \ell 2 \times COS(\theta 1 + \theta 2)))$ --.

Column 21, line 23, equation (2), delete "$13 = 11 \times TAN(\theta 1-\theta 2)$" and insert therefor -- $\ell 3 = \ell 1 \times TAN(\theta 1 - \theta 2)$ --.

Column 21, line 25, equation (3), delete "$13 = 12 \times SIN(\theta 1+\theta 2)/SIN\ \theta 3$" and insert therefor -- $\ell 3 = \ell 2 \times SIN(\theta 1 + \theta 2)/SIN\ \theta 3$ --.

UNITED STATES PATENT AND TRADEMARK OFFICE
CERTIFICATE OF CORRECTION

PATENT NO. : 5,864,360
DATED : January 26, 1999
INVENTOR(S) : Shigeki Okauchi and Sunao Kurahashi It is certified that error appears in the above-identified patent and that said Letters Patent is hereby corrected as shown below:

Column 21, line 27, delete "distance 13 is" and insert therefor -- distance $\ell 3$ is --.

Column 21, line 31, delete "distance 11 is" and insert therefor -- distance $\ell 1$ is --.

Column 21, line 47, delete "12. Therefore, 11, 12, θ1," and insert therefor -- $\ell 2$. Therefore, $\ell 1$, $\ell 2$, θ1, --.

Column 21, line 48, delete "and 13 and 14 are" and insert therefor -- and $\ell 3$ and $\ell 4$ are --.

Column 21, line 50, delete "to 14, and" and insert therefor -- to $\ell 4$, and --.

Column 21, line 53, delete "13 and" and insert therefor -- $\ell 3$ and --.

Column 21, line 55, delete "the distance 14" and insert therefor -- the distance $\ell 4$ --.

Column 21, line 63, delete "distance 14 to" and insert therefor -- distance $\ell 4$ to --.

Column 22, line 10, delete "acquiring 12. Therefore, 11, 12, θ1," and insert therefor -- acquiring $\ell 2$. Therefore, $\ell 1$, $\ell 2$, θ1, --.

Column 22, line 11, delete "and 13 and 14 are" and insert therefor -- and $\ell 3$ and $\ell 4$ are --.

Column 22, line 13, delete "to 14, and" and insert therefor -- to $\ell 4$, and --.

Column 22, line 15, delete "based on 13" and insert therefor -- based on $\ell 3$ --.

Column 23, lines 8-9, equation (4), delete "κ=1/(1+TAN αxTAN(α+β))/(2x((1/(1+TAN αxTAN(α-β))-(COSα)²))" and insert therefor -- $\kappa = 1/(1 + TAN\alpha \times TAN(\alpha + \beta))/(2 \times ((1/(1 + TAN\alpha \times TAN(\alpha - \beta)) - (COS\alpha)^2))$ --.

Signed and Sealed this

Twenty-first Day of September, 1999

Attest:

Q. TODD DICKINSON

*Attesting Officer*      *Acting Commissioner of Patents and Trademarks*